(12) United States Patent
Winkler et al.

(10) Patent No.: US 11,781,485 B2
(45) Date of Patent: Oct. 10, 2023

(54) UNIT CELL RESONATOR NETWORKS FOR GAS TURBINE COMBUSTOR TONE DAMPING

(71) Applicant: RAYTHEON TECHNOLOGIES CORPORATION, Farmington, CT (US)

(72) Inventors: Julian Winkler, Glastonbury, CT (US); Kenji Homma, Glastonbury, CT (US); Craig Aaron Reimann, Vernon, CT (US); Jeffrey Michael Mendoza, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/535,270

(22) Filed: Nov. 24, 2021

(65) Prior Publication Data
US 2023/0160343 A1 May 25, 2023

(51) Int. Cl.
  *F02C 7/24* (2006.01)
  *F23R 3/00* (2006.01)
  *F02C 7/045* (2006.01)

(52) U.S. Cl.
  CPC ............... *F02C 7/24* (2013.01); *F02C 7/045* (2013.01); *F23R 3/002* (2013.01);
  (Continued)

(58) Field of Classification Search
  CPC ....... B32B 2307/10; F01N 1/023; F01N 1/04; F02C 7/045; F02C 7/16; F02C 7/24;
  (Continued)

(56) References Cited

U.S. PATENT DOCUMENTS

| | | |
|---|---|---|
| 4,135,603 A | 1/1979 | Lee et al. |
| 6,069,840 A | 5/2000 | Griffin et al. |
| | (Continued) | |

FOREIGN PATENT DOCUMENTS

| | | |
|---|---|---|
| CN | 109501404 | 3/2019 |
| EP | 2820270 | 1/2015 |
| | (Continued) | |

OTHER PUBLICATIONS

USPTO; Non-Final Office Action dated Feb. 28, 2023 in U.S. Appl. No. 17/318,868.
(Continued)

*Primary Examiner* — Scott J Walthour
(74) *Attorney, Agent, or Firm* — SNELL & WILMER L.L.P.

(57) ABSTRACT

A noise attenuation panel for a structure within a propulsion system includes a first plurality of unit cells; and a second plurality of unit cells, the second plurality of unit cells merged within the first plurality of unit cells, the first plurality of unit cells including a first periodic structure having a first unit cell, a second unit cell, a third unit cell and a fourth unit cell, each of the first unit cell, the second unit cell, the third unit cell and the fourth unit cell including a central body interconnected via a plurality of lateral tubes extending from the central body, the first periodic structure forming a first lateral layer of unit cells.

18 Claims, 22 Drawing Sheets

(52) U.S. Cl.
CPC ...... *B32B 2307/10* (2013.01); *F05D 2240/35* (2013.01); *F05D 2260/964* (2013.01); *F23R 2900/00014* (2013.01); *F23R 2900/03045* (2013.01)

(58) Field of Classification Search
CPC ........... F05D 2260/96; F05D 2260/963; F05D 2260/964; F23R 3/002; F23R 3/005; F23R 5/00; F23R 2900/00014
See application file for complete search history.

(56) References Cited

U.S. PATENT DOCUMENTS

| | | | |
|---|---|---|---|
| 6,098,926 | A | 8/2000 | Morgenthaler |
| 6,116,375 | A | 9/2000 | Lorch et al. |
| 6,179,086 | B1 | 1/2001 | Bansemir et al. |
| 7,018,172 | B2 | 3/2006 | Prasad et al. |
| 7,076,956 | B2 | 7/2006 | Young et al. |
| 7,311,175 | B2 | 12/2007 | Proscia et al. |
| 7,334,998 | B2 | 2/2008 | Jones et al. |
| 7,540,354 | B2 | 6/2009 | Morin et al. |
| 7,607,287 | B2 | 10/2009 | Reba et al. |
| 10,066,548 | B2 | 9/2018 | Gilson et al. |
| 10,107,191 | B2 | 10/2018 | Gilson et al. |
| 10,113,559 | B2 | 10/2018 | Turner et al. |
| 10,209,009 | B2 | 2/2019 | Gerstler et al. |
| 10,371,381 | B2 | 8/2019 | Xu |
| 10,704,841 | B2 | 7/2020 | Manzo |
| 10,724,739 | B2 | 7/2020 | Kim et al. |
| 10,823,409 | B2 | 11/2020 | Bertoldi et al. |
| 11,261,738 | B2 | 3/2022 | Chakrabarti et al. |
| 2005/0284690 | A1 | 12/2005 | Proscia et al. |
| 2007/0012508 | A1 | 1/2007 | Demers |
| 2009/0166127 | A1 | 7/2009 | Thomas et al. |
| 2013/0219922 | A1 | 8/2013 | Gilson et al. |
| 2018/0299066 | A1 | 10/2018 | Erno et al. |
| 2020/0101690 | A1 | 4/2020 | Oishi et al. |
| 2020/0191101 | A1* | 6/2020 | Boardman ............... F23R 3/346 |
| 2020/0378111 | A1 | 12/2020 | Fishman et al. |
| 2020/0384695 | A1 | 12/2020 | Mardjono et al. |
| 2020/0386154 | A1 | 12/2020 | Gilson et al. |
| 2021/0074255 | A1 | 3/2021 | Guo et al. |
| 2021/0095617 | A1 | 4/2021 | Richter et al. |
| 2021/0231057 | A1 | 7/2021 | Livebardon et al. |
| 2021/0372286 | A1* | 12/2021 | Chakrabarti ............. B22F 5/04 |

FOREIGN PATENT DOCUMENTS

| | | |
|---|---|---|
| EP | 2239420 | 1/2016 |
| EP | 3179071 | 6/2017 |
| EP | 3636550 | 4/2020 |
| EP | 3869499 | 8/2021 |
| EP | 4089669 | 11/2022 |
| GB | 2361035 | 10/2001 |
| GB | 2471845 | 1/2011 |
| WO | 2005100753 | 10/2005 |
| WO | 2011034469 | 3/2011 |
| WO | 2013130295 | 9/2013 |
| WO | 2014105108 | 7/2014 |
| WO | 2020122886 | 6/2020 |
| WO | 2020221976 | 11/2020 |

OTHER PUBLICATIONS

European Patent Office, European Search Report dated Oct. 4, 2022 in Application No. 22172325.7.

European Patent Office, European Search Report dated Oct. 4, 2022 in Application No. 22173018.7.

Guo Jingwen et a: "Wideband low frequency sound absorption by inhomogeneous multi-layer resonators with extended necks", Composite Structures, Elsevier Science Ltd, GB, vol. 260, Jan. 6, 2021 (Jan. 6, 2021).

Li Dingzeyu et al: "Acoustin voxels", ACM Transactions on Graphics, ACM, NY, US, vol. 35, No. 4, Jul. 11, 2016 (Jul. 11, 2016).

European Patent Office, European Search Report dated Mar. 24, 2023 in Application No. 22201750.1.

European Patent Office, European Search Report dated Apr. 14, 2023 in Application No. 22207011.2.

USPTO; Non-Final Office Action dated Mar. 23, 2023 in U.S. Appl. No. 17/503,285.

USPTO; Non-Final Office Action dated Jun. 8, 2023 in U.S. Appl. No. 17/318,898.

* cited by examiner

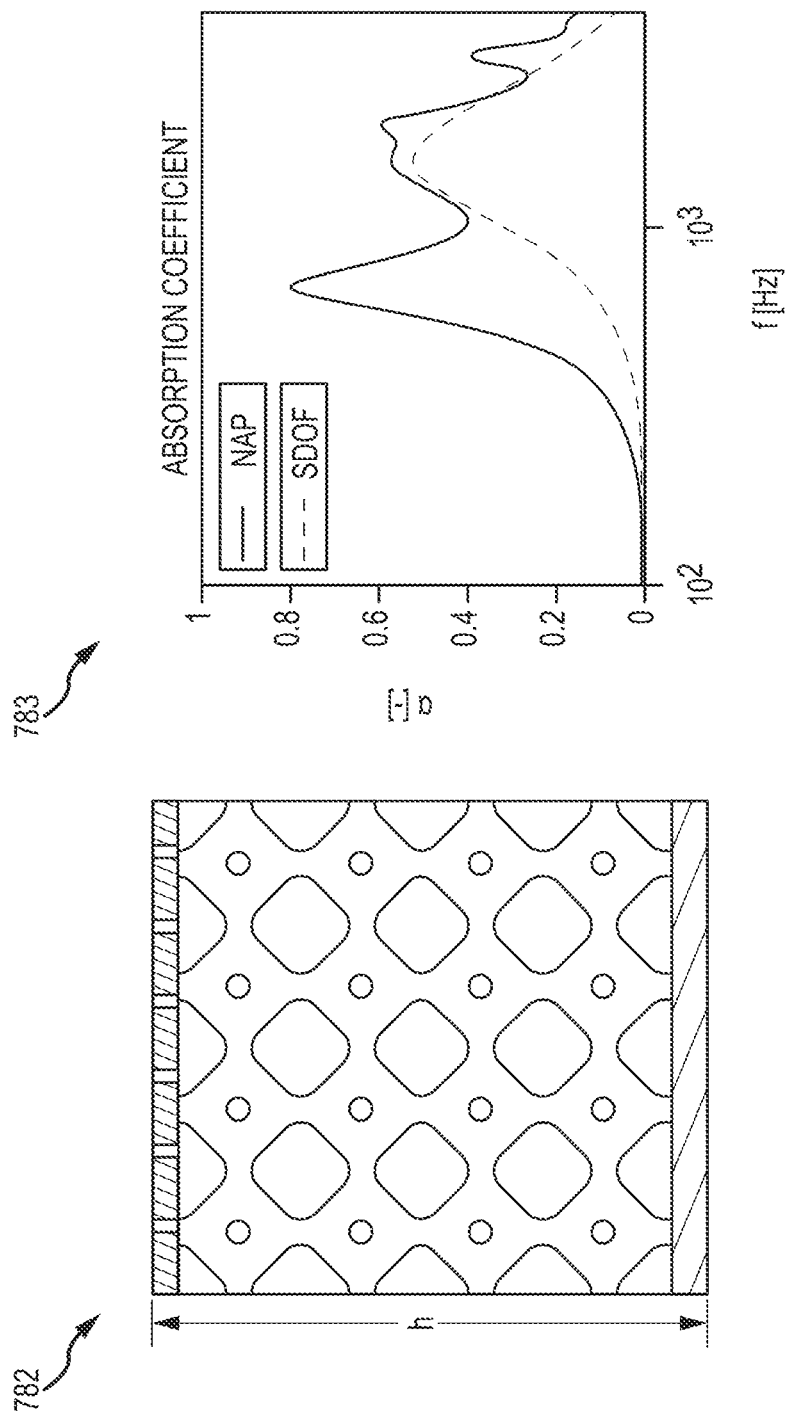

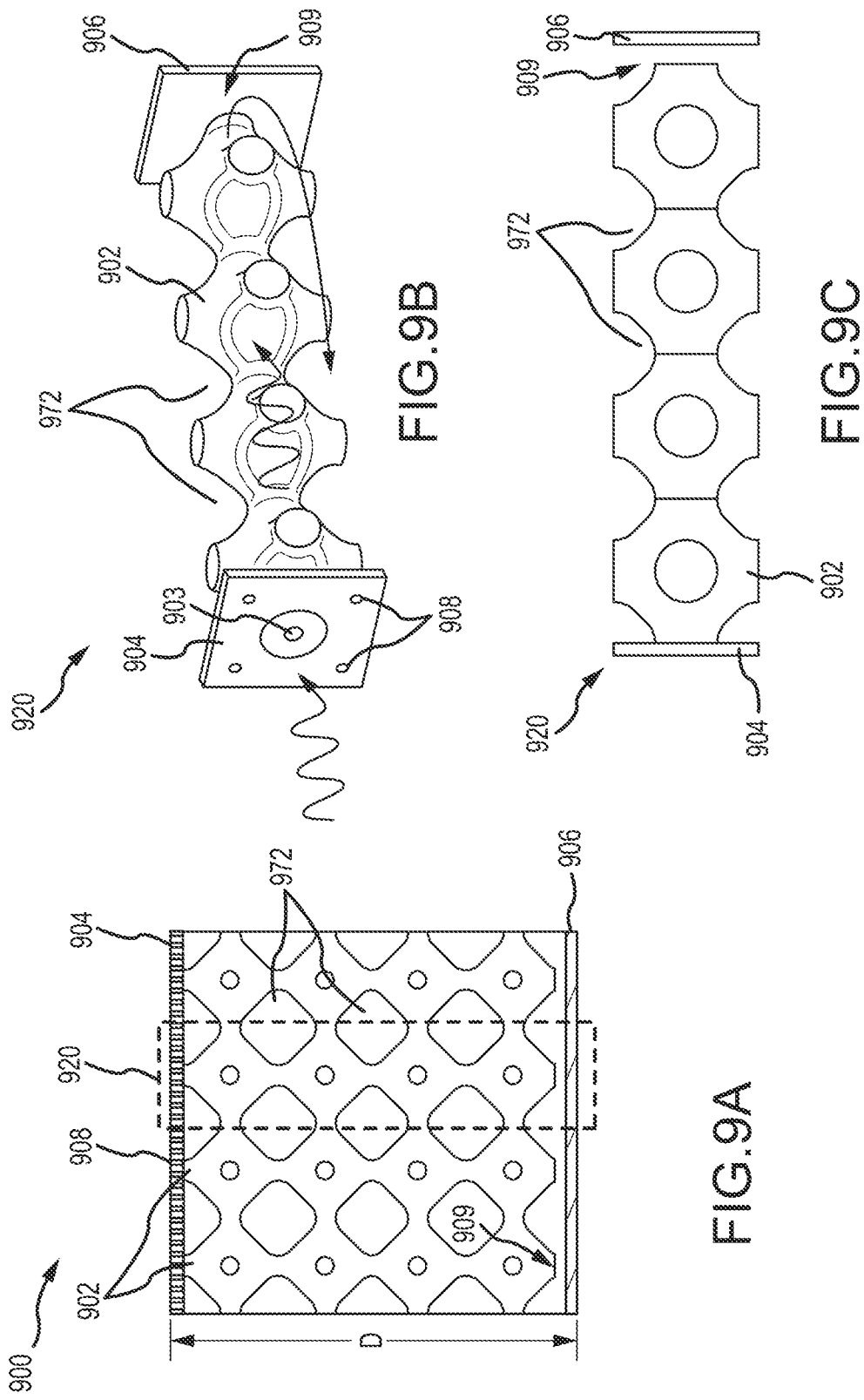

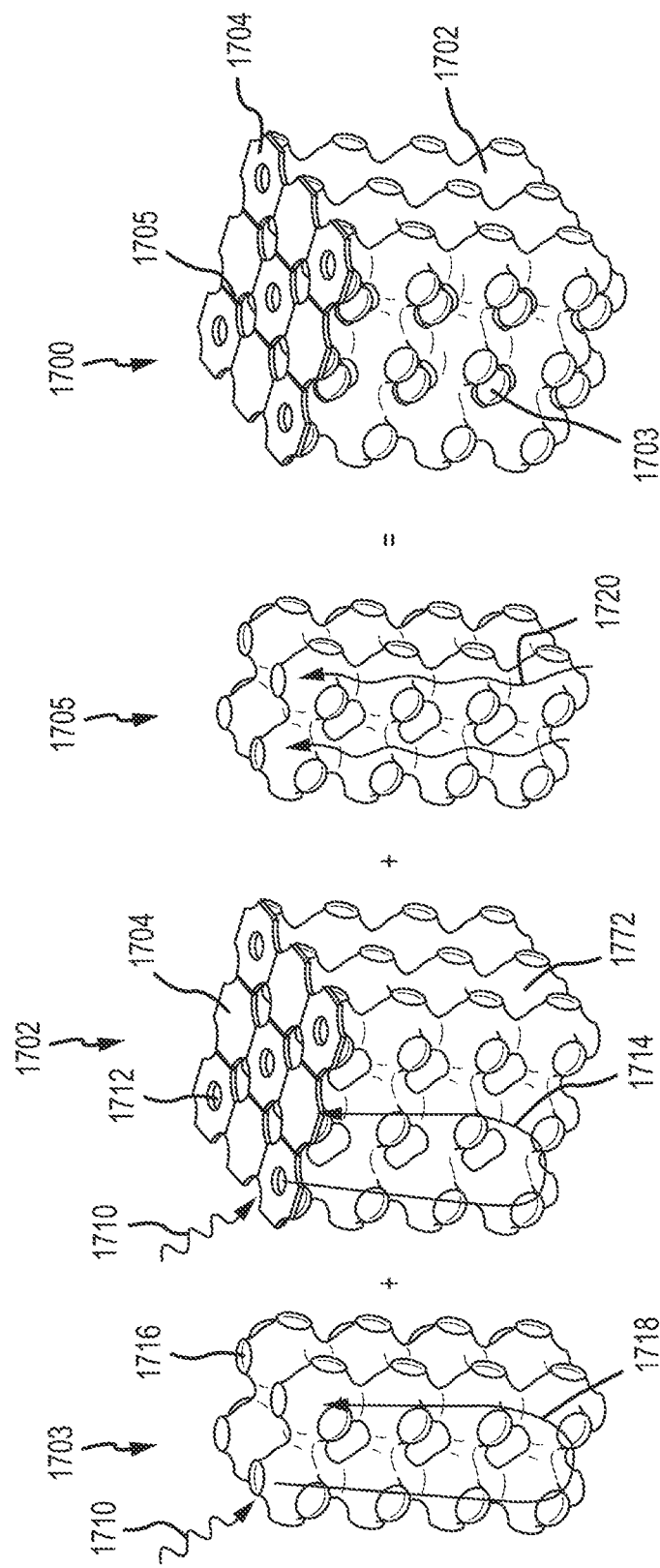

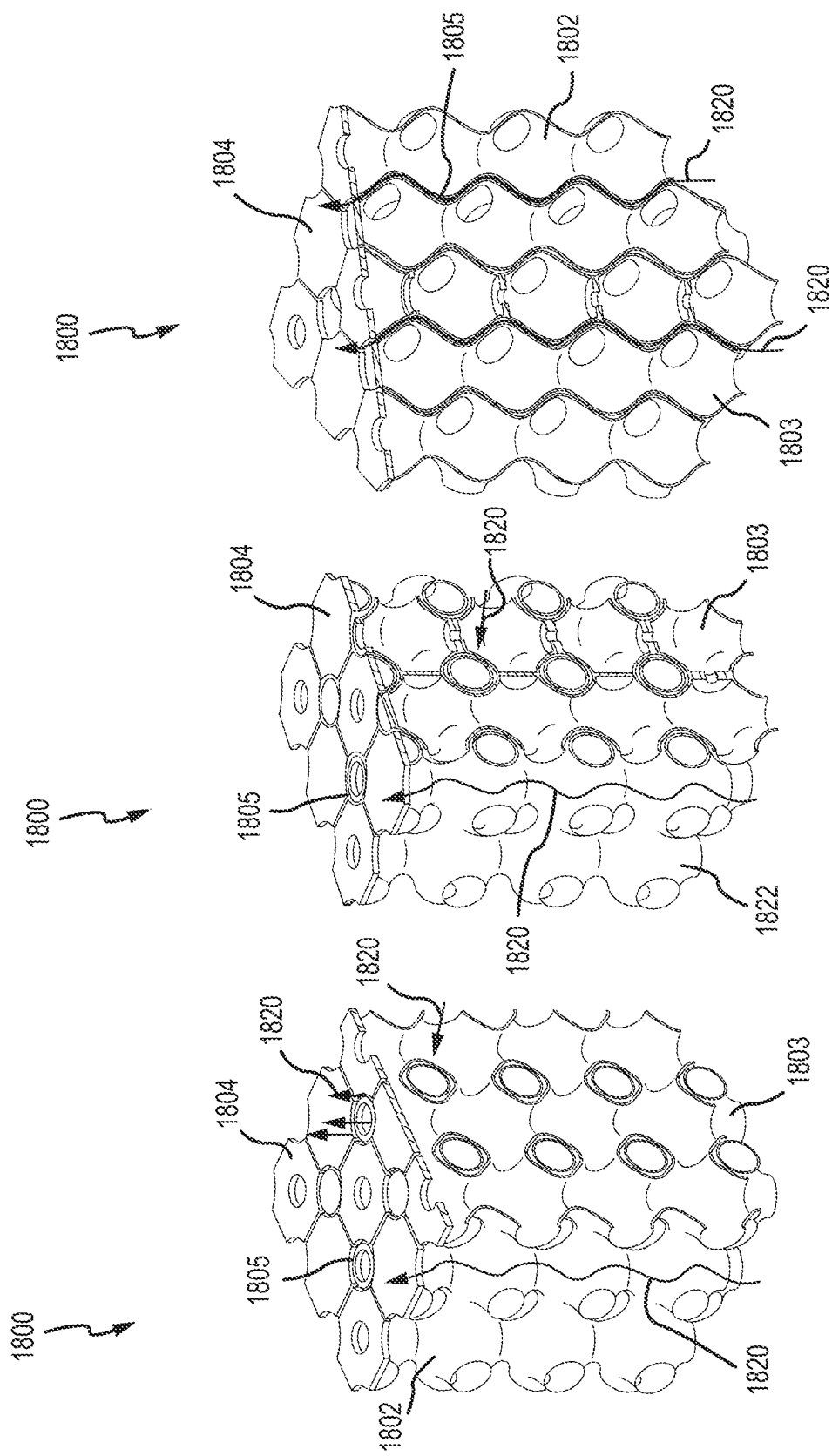

UNIT CELL RESONATOR NETWORKS FOR GAS TURBINE COMBUSTOR TONE DAMPING

FIELD

The present disclosure relates generally to attenuation structures for reducing acoustic noise and, more particularly, to acoustic panels for reducing noise generated within the combustors of gas turbine engines or propulsion systems.

BACKGROUND

Acoustic panels may be used for noise suppression or attenuation in aerospace applications and other fields. The panels typically comprise two skin surfaces that sandwich between them at least one layer of a core material or structure. The two skins and the core structure may be bonded together or cured or otherwise formed together, but mechanical fastening is also used in some applications. The core structure ties the skins together structurally and can form a very rigid, efficient and lightweight structure for noise suppression or attenuation useful in aerospace applications, such as for example, in cabins or other areas of passenger aircraft. The panels may be given acoustic properties by perforating one skin (typically an air washed side of the panel) with specifically sized volumes. This enables the cells of the core structure to act like individual Helmholtz or quarter-wave resonators that attenuate a certain tone or tones, at specific or broadband frequencies or wavelengths, of noise generated outside an aircraft—e.g., by an engine or airflow over the fuselage—or noise generated within an aircraft—e.g., by personal audio/visual equipment, galley equipment or air management equipment. These acoustic panels, where the resonators are sandwiched by a single pair of skins, are typically referred to as single-degree of freedom (SDOF) liners or panels. Acoustic panels may also be constructed as double-degree of freedom (DDOF) or multiple-degree of freedom (MDOF) liners or panels, comprising two or more layers of resonators, that provide broader frequency noise reduction.

SUMMARY

A noise attenuation panel for a structure within a propulsion system is disclosed. In various embodiments, the noise attenuation panel includes a first plurality of unit cells; and a second plurality of unit cells, the second plurality of unit cells merged within the first plurality of unit cells, the first plurality of unit cells including a first periodic structure having a first unit cell, a second unit cell, a third unit cell and a fourth unit cell, each of the first unit cell, the second unit cell, the third unit cell and the fourth unit cell including a central body interconnected via a plurality of lateral tubes extending from the central body, the first periodic structure forming a first lateral layer of unit cells.

In various embodiments, the first plurality of unit cells defines a plurality of volumes and the second plurality of unit cells is merged within the first plurality of unit cells by positioning the second plurality of unit cells within the plurality of volumes. In various embodiments, exterior surfaces of the first plurality of unit cells and the second plurality of unit cells are spaced apart to form a spacing between the exterior surfaces. In various embodiments, the spacing provides a flow path for a cooling fluid to flow between the exterior surfaces of the first plurality of unit cells and the second plurality of unit cells.

In various embodiments, the first plurality of unit cells defines a first noise attenuation flow path and the second plurality of unit cells defines a second noise attenuation flow path. In various embodiments, the first noise attenuation flow path and the second noise attenuation flow path are configured to attenuate different frequency ranges.

In various embodiments, the plurality of volumes includes a first volume having a first volume size and a second volume having a second volume size different from the first volume size.

In various embodiments, the first unit cell includes a first central body and a first axial tube disposed on the first central body and a second axial tube disposed on the first central body, opposite the first axial tube, each of the first axial tube and the second axial tube being in fluid communication with one another through the first central body. In various embodiments, the first unit cell includes a first lateral tube, disposed on and in fluid communication with the first central body, and a second lateral tube, opposite the first lateral tube and disposed on and in fluid communication with the first central body.

In various embodiments, the first unit cell includes a third lateral tube, disposed on and in fluid communication with the first central body, and a fourth lateral tube, opposite the third lateral tube and disposed on and in fluid communication with the first central body and wherein each of the first axial tube, the second axial tube, the first lateral tube, the second lateral tube, the third lateral tube and the fourth lateral tube are in fluid communication with each other via the first central body.

In various embodiments, the first axial tube exhibits a first axial tube size, the second axial tube exhibits a second axial tube size, the first lateral tube exhibits a first lateral tube size, the second lateral tube exhibits a second lateral tube size, the third lateral tube exhibits a third lateral tube size and the fourth lateral tube exhibits a fourth lateral tube size and at least one of the first axial tube size, the second axial tube size, the first lateral tube size, the second lateral tube size, the third lateral tube size or the fourth lateral tube size exhibits a first size and at least one of the first axial tube size, the second axial tube size, the first lateral tube size, the second lateral tube size, the third lateral tube size or the fourth lateral tube size exhibits a second size that is different from the first size.

In various embodiments, at least one of the first axial tube, the second axial tube, the first lateral tube, the second lateral tube, the third lateral tube or the fourth lateral tube is completely sealed via a wall configured to block a flow of fluid therethrough. In various embodiments, at least one of the first axial tube, the second axial tube, the first lateral tube, the second lateral tube, the third lateral tube or the fourth lateral tube is partially sealed.

A combustor for a gas turbine engine is disclosed. In various embodiments, the combustor includes a combustion chamber; and a noise attenuation panel, including a first plurality of unit cells, and a second plurality of unit cells, the second plurality of unit cells merged within the first plurality of unit cells, the first plurality of unit cells including a first periodic structure having a first unit cell, a second unit cell, a third unit cell and a fourth unit cell, each of the first unit cell, the second unit cell, the third unit cell and the fourth unit cell including a central body interconnected via a plurality of lateral tubes extending from the central body, the first periodic structure forming a first lateral layer of unit cells. In various embodiments, the combustion chamber is in the form of a rotating detonation engine.

In various embodiments, the first plurality of unit cells defines a plurality of volumes and the second plurality of unit cells is merged within the first plurality of unit cells by positioning the second plurality of unit cells within the plurality of volumes. In various embodiments, exterior surfaces of the first plurality of unit cells and the second plurality of unit cells are spaced apart to form a spacing between the exterior surfaces. In various embodiments, the spacing provides a flow path for a cooling fluid to flow between the exterior surfaces of the first plurality of unit cells and the second plurality of unit cells.

In various embodiments, the first plurality of unit cells defines a first noise attenuation flow path and the second plurality of unit cells defines a second noise attenuation flow path. In various embodiments, the first noise attenuation flow path and the second noise attenuation flow path are configured to attenuate different frequency ranges.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 7A and 7B are schematic views of a noise attenuation panel of the present disclosure and a performance graph illustrating improvements over conventional single-degree of freedom cell-based structures, in accordance with various embodiments;

FIGS. 9A, 9B and 9C are schematic illustrations of a noise attenuation panel of the present disclosure, in accordance with various embodiments;

FIGS. 17A, 17B, 17C and 17D are schematic illustrations of various components of a noise attenuation panel, in accordance with various embodiments;

FIGS. 18A, 18B, 18C, 18D, 18E, 18F and 18G are schematic illustrations of the solid lattice component and the fluid lattice component of the noise attenuation panel illustrated at FIGS. 17A-17D, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
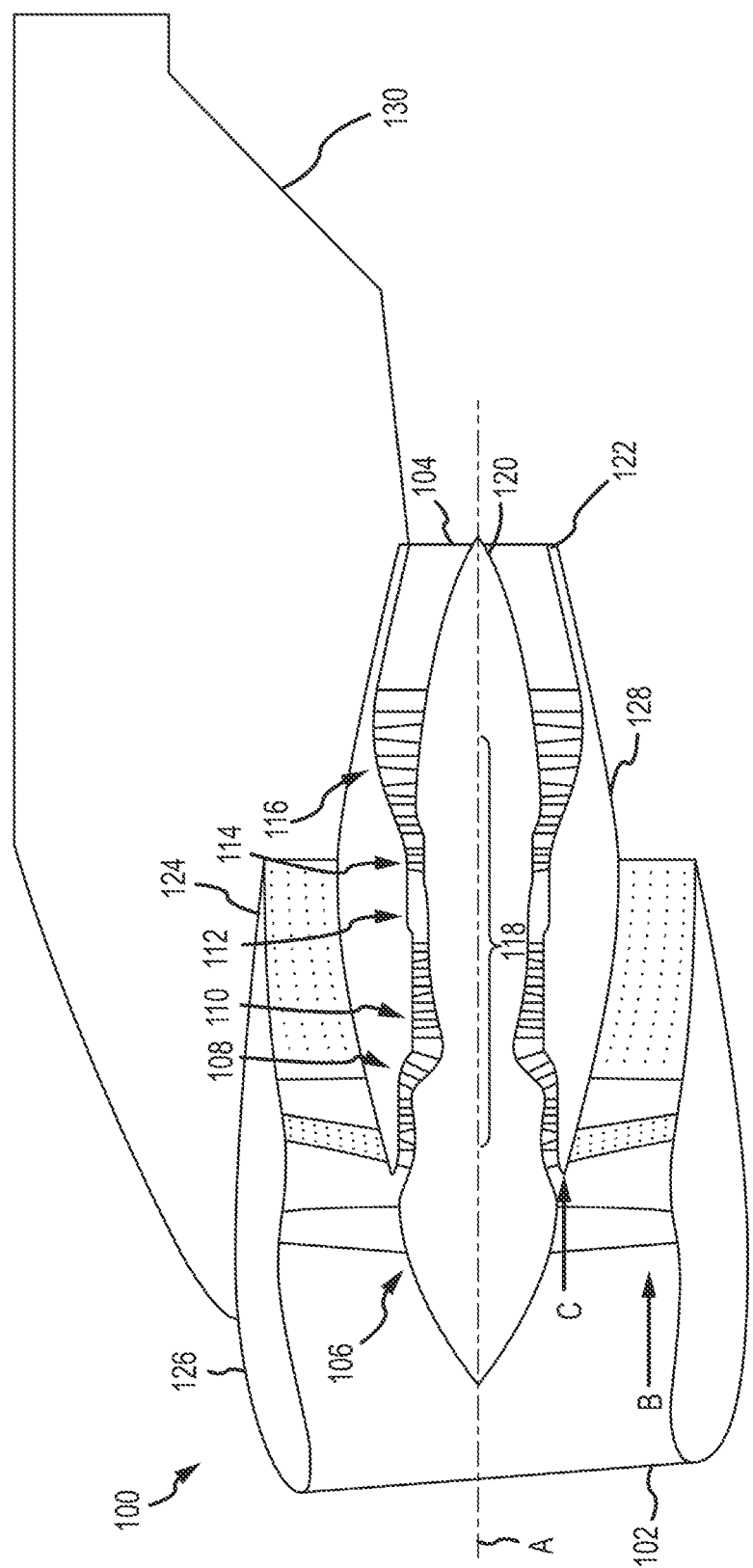
FIG. 1 is a schematic representation of a gas turbine engine used as a propulsion system on an aircraft, in accordance with various embodiments.

Referring now to FIG. 1, a side cutaway illustration of a gas turbine engine 100 is provided. The gas turbine engine 100 extends along an axial centerline A between an airflow inlet 102 and a core exhaust system 104. The gas turbine engine 100 includes a fan section 106, a low-pressure compressor section 108 (LPC), a high-pressure compressor section 110 (HPC), a combustor section 112, a high-pressure turbine section 114 (HPT) and a low-pressure turbine section (LPT) 116. The various engine sections are typically arranged sequentially along the axial centerline A. In various embodiments, the low-pressure compressor section 108 (LPC), the high-pressure compressor section 110 (HPC), the combustor section 112, the high-pressure turbine section 114 (HPT) and the low-pressure turbine section 116 (LPT) form a core 118 (or an engine core) of the gas turbine engine 100.

Air enters the gas turbine engine 100 through the airflow inlet 102, and is directed through the fan section 106 and into a core gas flow path C and a bypass gas flow path B. The air within the core gas flow path C may be referred to as "core air." The air within the bypass gas flow path B may be referred to as "bypass air." The core air is directed through the low-pressure compressor section 108, the high-pressure compressor section 110, the combustor section 112, the high-pressure turbine section 114 and the low-pressure turbine section 116 and exits the gas turbine engine 100 through the core exhaust system 104, which includes an exhaust center body 120 surrounded by an exhaust nozzle 122. Within the combustor section 112, fuel is injected into and mixed with the core air and ignited to provide a hot airstream that drives the turbine sections. The bypass air is directed through the bypass gas flow path B, and out of the gas turbine engine 100 through a bypass exhaust nozzle 124 to provide forward engine thrust. The bypass air may also or alternatively be directed through a thrust reverser, positioned, for example, at or proximate the bypass exhaust nozzle 124, to provide reverse engine thrust. A fan nacelle 126 is typically employed to surround the various sections of the gas turbine engine 100 and a core nacelle 128 is typically employed to surround the various sections of the core 118. The gas turbine engine 100 is typically secured to an airframe (e.g., a fuselage or a wing) via a pylon 130.

Figure 2A:
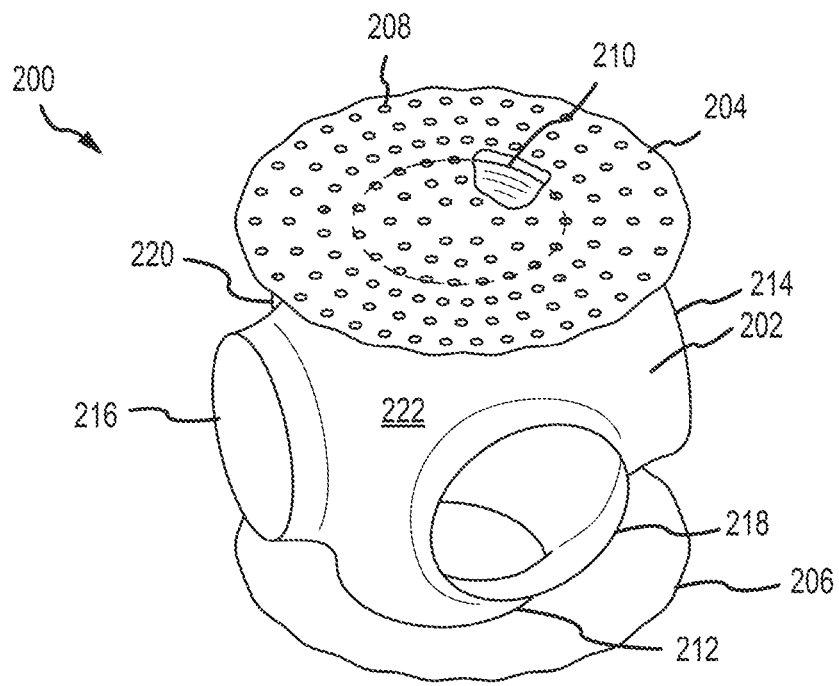
FIGS. 2A and 2B are schematic illustrations of noise attenuation panels for use in a gas turbine engine, in accordance with various embodiments.
Figure 2B:
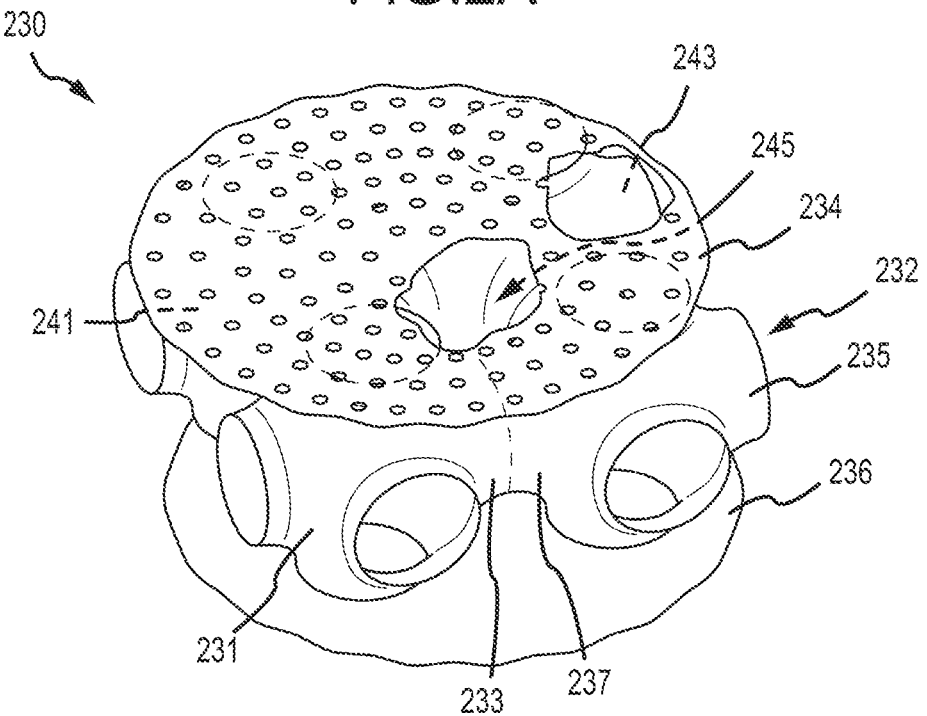

Referring now to FIGS. 2A and 2B, schematic views of a noise attenuation panel (or an acoustic attenuation structure) are provided; the noise attenuation panels described and illustrated in these figures are oversimplified to explain various features of the panels. Referring specifically to FIG. 2A, a noise attenuation panel 200 is illustrated having a unit cell 202 sandwiched between a facesheet 204 and a back plate 206. The facesheet 204 typically includes a plurality of perforations or openings 208 to communicate acoustic waves or energy to the unit cell 202, which acts as a resonator to damp or attenuate the acoustic waves or energy. The back plate 206 typically is non-perforated and, together with the facesheet 204, provides a support structure for the unit cell 202; note that while the back plates described and illustrated in this disclosure are described as typically being non-perforated, there is no requirement that perforations may not be incorporated into or through the back plates. In various embodiments, and as will be described in further detail below, the unit cell 202 includes a pair of axial tubes, including, for example, a first axial tube 210 connected to the facesheet 204 and a second axial tube 212, opposite the first axial tube 210 (e.g., the first axial tube 210 being axially aligned with the second axial tube 212), connected to the back plate 206. In various embodiments, the unit cell 202 further includes a first pair of lateral tubes, such as, for example, a first lateral tube 214 and a second lateral tube 216, opposite the first lateral tube 214 (e.g., the first lateral tube 214 being axially aligned with the second lateral tube 216). In various embodiments, the unit cell 202 further includes a second pair of lateral tubes, such as, for example, a third lateral tube 218 and a fourth lateral tube 220, opposite the third lateral tube 218 (e.g., the third lateral tube 218 being axially aligned with the fourth lateral tube 220). As also described further below, while the various tubes (or tubular structures) are illustrated in FIG. 2A as having an opening into a central body 222 of the unit cell 202, the various tubes may be connected to the tubes of adjacent unit cells (see, e.g., FIG. 2B) or may be completely or partially closed (or sealed) via a wall or a mesh, which may include a perforated or a similar structure, the wall or the mesh being configured to block or partially restrict, respectively, a flow of fluid therethrough.

Further, it is noted that while the unit cell 202 may comprise a structure that exhibits various degrees of symmetry (e.g., a cubic symmetry typical of a Schwarz P surface), the various tubes or central bodies among a plurality of interconnected unit cells may be sized or shaped identically or exhibit different sizes or shapes among such plurality of interconnected unit cells. For example, the first axial tube 210 may exhibit a first axial tube size (e.g., a first diameter or first length), the second axial tube 212 may exhibit a second axial tube size (e.g., a second diameter or second length), the first lateral tube 214 may exhibit a first lateral tube size (e.g., diameter or length), the second lateral tube 216 may exhibit a second lateral tube size (e.g., diameter or length), the third lateral tube 218 may exhibit a third lateral tube size (e.g., diameter or length) and the fourth lateral tube 220 may exhibit a fourth lateral tube size (e.g., diameter or length) and at least one of the first axial tube size, the second axial tube size, the first lateral tube size, the second lateral tube size, the third lateral tube size or the fourth lateral tube size exhibits a first size and at least one of the first axial tube size, the second axial tube size, the first lateral tube size, the second lateral tube size, the third lateral tube size or the fourth lateral tube size exhibits a second size that is different from the first size. Note also that in various embodiments, each of the first axial tube 210, the second axial tube 212, the first lateral tube 214, the second lateral tube 216, the third lateral tube 218 and the fourth lateral tube 220 are in fluid communication with each other via the central body 222.

Referring now to FIG. 2B, with continued reference to FIG. 2A, a noise attenuation panel 230 is illustrated having a plurality of unit cells 232, each having the shape of the unit cell 202, interconnected and sandwiched between a facesheet 234 and a back plate 236. In various embodiments, the plurality of unit cells 232 is formed by interconnecting adjacent lateral tubes of adjacent unit cells together. For example, as illustrated in FIG. 2B, a first unit cell 231 having a first lateral tube 233 may be interconnected to a second unit cell 235 having a second lateral tube 237 by interconnecting the first lateral tube 233 to the second lateral tube 237. In similar fashion, a third unit cell 241 and a fourth unit cell 243 may be interconnected to each other and to, respectively, the first unit cell 231 and to the second unit cell 235. In such fashion, a periodic structure having a plurality of resonators configured to damp or attenuate acoustic waves or energy results. As described in further detail below, note the periodic structure of the plurality of unit cells 232, interconnected as described, results in a volume 245 at the center of the periodic structure and extending axially between the facesheet 234 and the back plate 236. In various embodiments, the volume 245 may be sized to damp or attenuate acoustic waves or energy at different frequencies as do the plurality of unit cells 232.

Figure 3A:
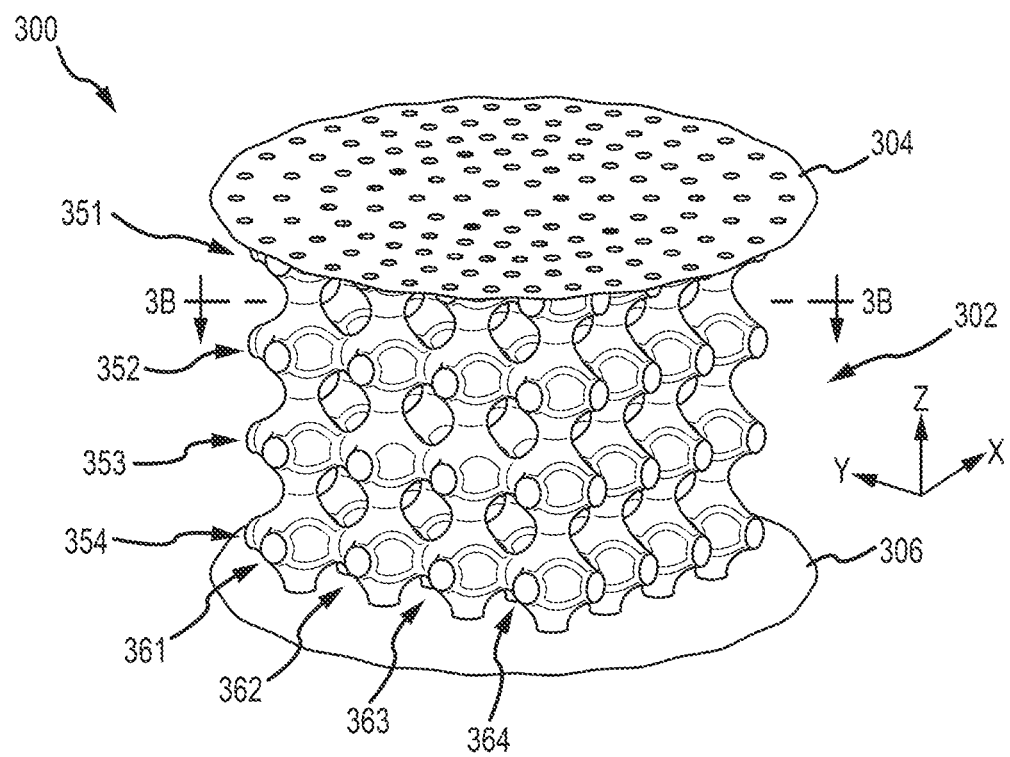
FIGS. 3A and 3B are schematic illustrations of noise attenuation panels for use in a gas turbine engine, in accordance with various embodiments.
Figure 3B:
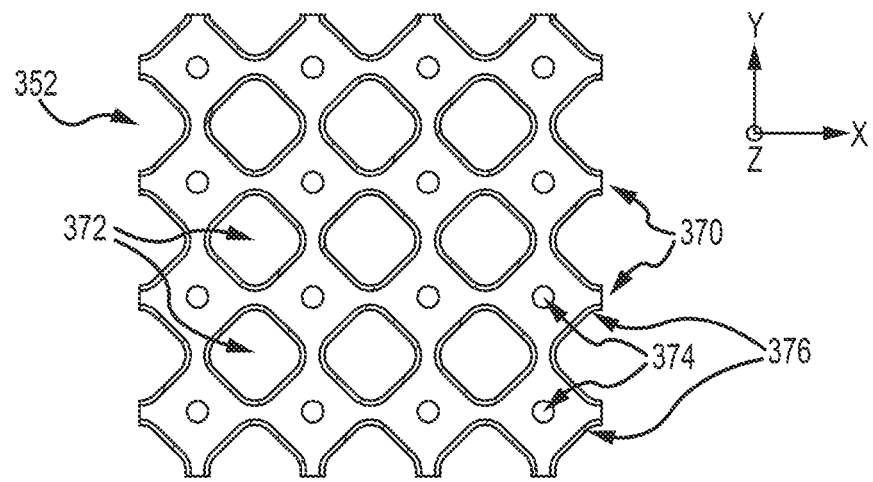

Referring now to FIGS. 3A and 3B, schematic views of a noise attenuation panel 300, similar to the noise attenuation panels described above, are provided. The noise attenuation panel 300 is illustrated as having a plurality of unit cells 302 sandwiched between a facesheet 304 and a back plate 306. The facesheet 304 typically includes a plurality of perforations or openings 308 to communicate acoustic waves or energy to the plurality of unit cells 302, which acts as a resonator to damp or attenuate the acoustic waves or energy. The back plate 306 typically is non-perforated and, together with the facesheet 304, provides a support structure for the plurality of unit cells 302. Each member of the plurality of unit cells 302 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 302 is not repeated here.

One difference between the embodiments described with reference to FIGS. 2A and 2B and those described with reference to FIGS. 3A and 3B is the layered structure exhibited by the noise attenuation panel 300. For example, while the noise attenuation panel 230 described above with reference to FIG. 2B comprises a single layer of unit cells (or a first periodic structure), the noise attenuation panel 300 comprises a plurality of layers of unit cells, including, for example, a first lateral layer of unit cells 351 (or a first periodic structure), a second lateral layer of unit cells 352 (or a second periodic structure), a third lateral layer of unit cells 353 (or a third periodic structure) and a fourth lateral layer of unit cells 354 (or a fourth periodic structure). In various embodiments, each lateral layer of unit cells exhibits an N×M structure of unit cells, where N is the number of unit cells in a first direction (e.g., a first unit cell, a second unit cell . . . an Nth unit cell in the x-direction) and M is the number of unit cells in a second direction (e.g., a first unit cell, a second unit cell . . . an Mth unit cell in the y-direction). A similar arrangement applies to the layers of unit cells in the axial or the z-direction, which may be P in number, and include a first axial layer of unit cells 361 (or a first periodic structure), a second axial layer of unit cells 362 (or a second periodic structure), a third axial layer of unit cells 363 (or a third periodic structure) and a fourth axial layer of unit cells 364 (or a fourth periodic structure). Note that while each of M, N and P equals four (4) in FIGS. 3A and 3B, there is no requirement that M, N and P equal one another in any particular noise attenuation panel or embodiment thereof.

With primary reference now to FIG. 3B, and with continued reference to FIG. 3A, the second lateral layer of unit cells 352 is illustrated from an overhead (or axial or z-direction) perspective. Given the generally periodic structure of the noise attenuation panel 300, the second lateral layer of unit cells 352 may be considered representative of any of the lateral or axial layers of unit cells identified above. The layer of unit cells comprises an N×M plurality of unit cells 370 interconnected together (via a plurality of lateral tubes as described above) and an (N−1)×(M−1) plurality of volumes 372 disposed between the unit cells. The layer also comprises an N×M plurality of axial tubes 374 that extend into an N×M plurality of central bodies 376 of the unit cells (e.g., a first central body, a second central body . . . an N×Mth central body). As discussed further below, one or more of the individual members of the (N−1)×(M−1) plurality of volumes 372, the N×M plurality of axial tubes 374 and the plurality of lateral tubes may be either completely or partially sealed or restricted to tune the noise attenuation panel 300 to attenuate various frequencies of the acoustic energy spectrum that the noise attenuation panel 300 is being subjected during operation.

Figure 4A:
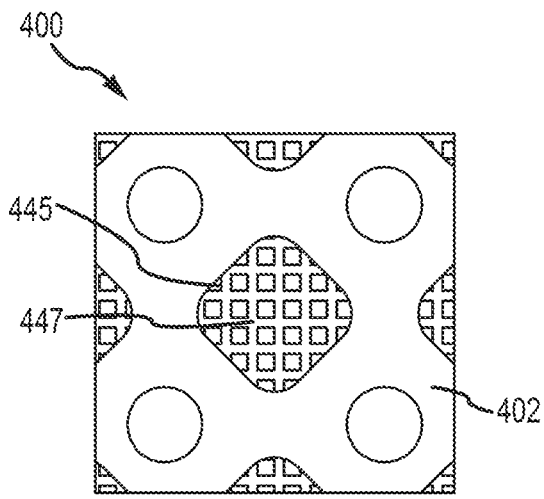
FIGS. 4A and 4B are schematic illustrations of noise attenuation panels for use in a gas turbine engine, in accordance with various embodiments.
Figure 4B:
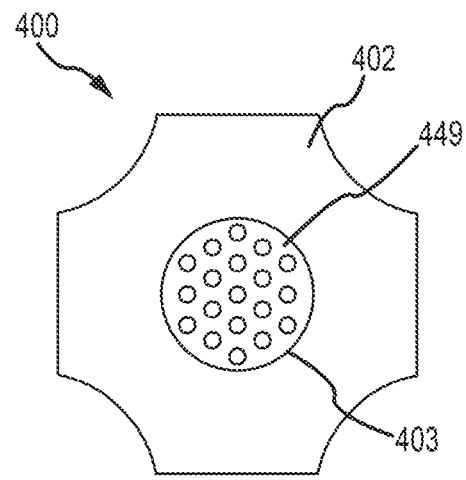

Referring now to FIGS. 4A and 4B, sectional schematic views of a portion of a noise attenuation panel 400, similar to any of the noise attenuation panels described above, are provided. Referring to FIG. 4A, for example, a schematic view of a volume 445, similar to the volume 245 illustrated in FIG. 2B or one of the (N−1)×(M−1) plurality of volumes 372 illustrated in FIG. 3B, is provided. As described above, the volume 445 is defined by a plurality of unit cells 402 that are interconnected via the interconnecting of lateral or axial tubes associated with the plurality of unit cells 402. As illustrated, the volume 445 is partially restricted via a volume filler 447, disposed throughout the space exterior to the unit cells, that is configured to act as a bulk absorber to reduce or restrict the flow of air through the volume 445. Note that in various embodiments, the volume filler 447 may comprise a plurality of layers of mesh-like materials, perforated structures or even acoustic foams so the resulting structure exhibits properties of a bulk material or a foam that either partially restricts or completely restricts the flow of air (or acoustic waves) within the space that is exterior to the plurality of unit cells 402. The partial or complete restriction provided by the volume filler 447 facilitates additional tuning of the noise attenuation panel 400 to attenuate over a broader frequency range of the acoustic energy spectrum. Similarly, referring to FIG. 4B, a schematic view of an isolated one of the plurality of unit cells 402, similar to one of the plurality of unit cells 232 illustrated in FIG. 2B or one of the plurality of unit cells 302 illustrated in FIG. 3A, is provided. As described above, the isolated one of the plurality of unit cells 402 includes a tube 403, either lateral or axial, depending on the orientation of the unit cell. As illustrated, the tube 403 is partially restricted via a tube mesh 449, which may include properties similar to those identified for the volume filler 447, that is configured to reduce or restrict the flow of air through the tube 403. The partial restriction provided by the tube mesh 449 facilitates tuning the noise attenuation panel 400 to attenuate specific frequencies of the acoustic energy spectrum the noise attenuation panel 400 is being subjected to during operation.

Figure 5A:
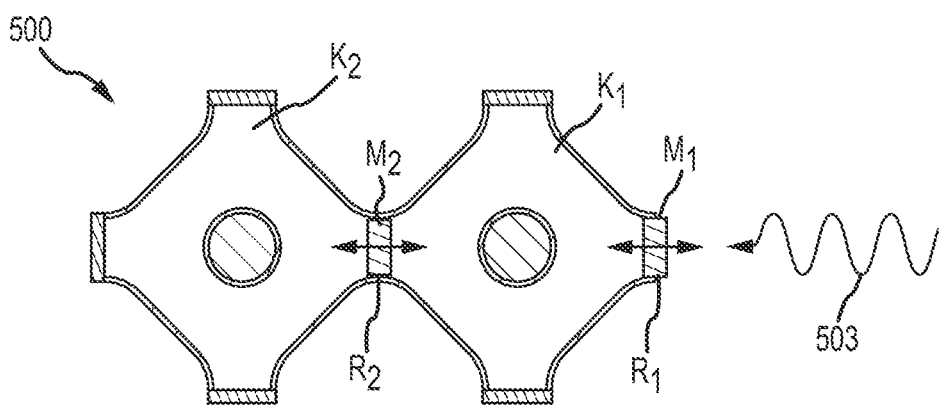
FIGS. 5A and 5B are schematic illustrations of noise attenuation panels for use in a gas turbine engine, in accordance with various embodiments.
Figure 5B:
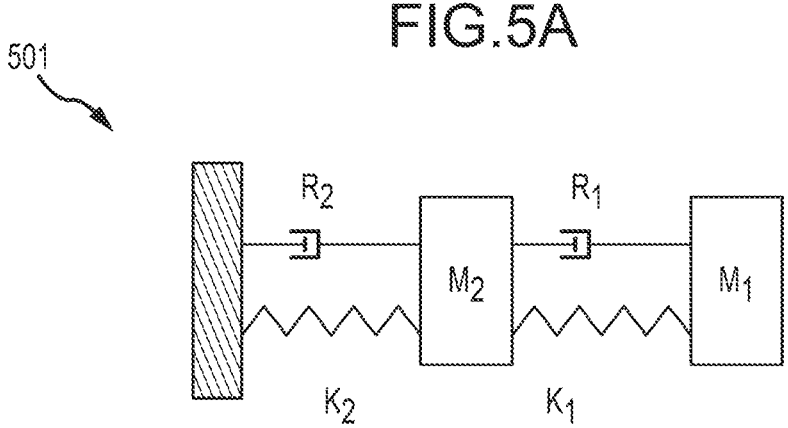

Referring now to FIGS. 5A and 5B, a model 501 that facilitates mathematical design of a noise attenuation panel 500 is described. As illustrated, the model 501 approximates the behavior or response of the noise attenuation panel 500 via a dynamical system that includes (i) a mass (e.g., $M_1$ and $M_2$) that represents the mass of air associated with an acoustic wave 503 that oscillates within a tube of a unit cell; (ii) a stiffness (e.g., $K_1$ and $K_2$) that represents the density of the air within the central body of the unit cell; and (iii) a dashpot (e.g., $R_1$ and $R_2$) that represents the energy dissipation associated with the air moving in the tubes. The dynamical system facilitates development of a set of differential equations that may be solved to approximate the behavior or response of the noise attenuation panel 500. The dynamical system may also account for complete or partial restriction of the various axial or lateral tubes associated with the unit cell. While the model 501 illustrated in FIG. 5B is representative of a simple two unit-cell system as illustrated in FIG. 5A, such models may be extended to arbitrarily large numbers of unit cells.

Figure 6A:
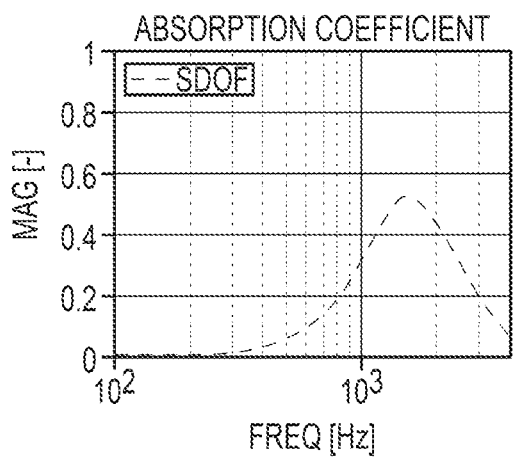
FIGS. 6A, 6B, 6C and 6D are schematic views of the noise attenuation panels of the present disclosure and performance graphs illustrating improvements over more conventional single-degree of freedom cell-based structures, in accordance with various embodiments.
Figure 6C:
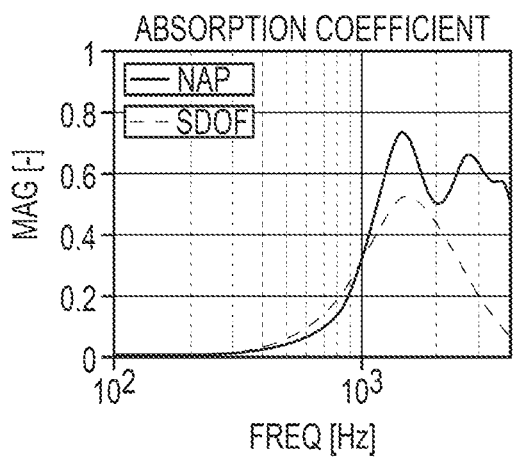
Figure 6B:
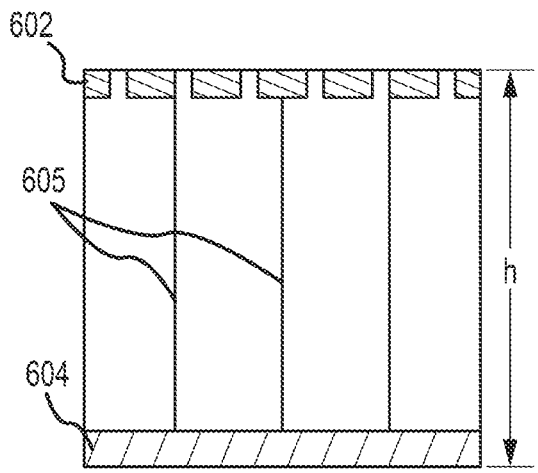
Figure 6D:
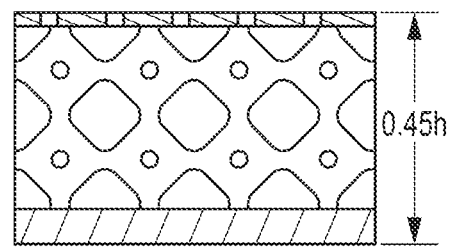

Referring now to FIGS. 6A, 6B, 6C and 6D, computational results are provided that illustrate various benefits of the noise attenuation panels presented and described in this disclosure. Referring to FIGS. 6A and 6B, a graph 681 showing absorption coefficient as a function of frequency is illustrated for a conventional single degree of freedom noise attenuation panel 680 (SDOF) having a facesheet 602 and a back plate 604 defining a height (h) of the panel, filled with a honeycomb structure 605. By way of comparison, FIGS. 6C and 6D illustrate a graph 683 showing absorption coefficient as a function of frequency for a noise attenuation panel 682 (NAP) having the same facesheet and a back plate as employed in the conventional single-degree of freedom noise attenuation panel 680. As indicated in the graph 683, the noise attenuation panel 682 provides a greater magnitude of noise attenuation at the design frequency and an extended attenuation bandwidth with more broadband absorption at higher frequencies, than the conventional single-degree of freedom noise attenuation panel 680 having a height (h) less than 50% of the height (h) of the conventional panel, thus providing a substantial space and potential weight savings and an increase in attenuation of noise over the conventional panel.

Referring now to FIGS. 7A and 7B, schematic views of a noise attenuation panel of the present disclosure and a performance graph illustrating improvements over more conventional single-degree of freedom cell-based structures are provided, in accordance with various embodiments. Referring to FIG. 7A, a noise attenuation panel 782, similar to the noise attenuation panel 682 described above, is depicted. Rather than having a height (h) equal to 0.45 h of the height (h) of the conventional single-degree of freedom noise attenuation panel 680, also described above, the noise attenuation panel 782 has a height (h) equal to the height (h) of the conventional single-degree of freedom noise attenuation panel 680. This enables a more direct comparison between the noise attenuation panel 782 and the conventional single-degree of freedom noise attenuation panel 680 when constructed to have the same dimension (e.g., the same height (h)). As illustrated in FIG. 7B, for example, a graph 783 showing absorption coefficient as a function of frequency for the noise attenuation panel 782 (NAP) and the conventional single-degree of freedom noise attenuation panel 680 (SDOF) is provided. As indicated in the graph 783, the noise attenuation panel 782 provides a greater magnitude of noise attenuation at the design frequency and at both higher and lower frequencies surrounding the design frequency than the conventional single-degree of freedom noise attenuation panel 680, thus providing an extended attenuation bandwidth with more broadband absorption at both higher and lower frequencies than the design frequency where the two noise attenuation panels share the same dimensional characteristics.

Figures 8A, 8B:
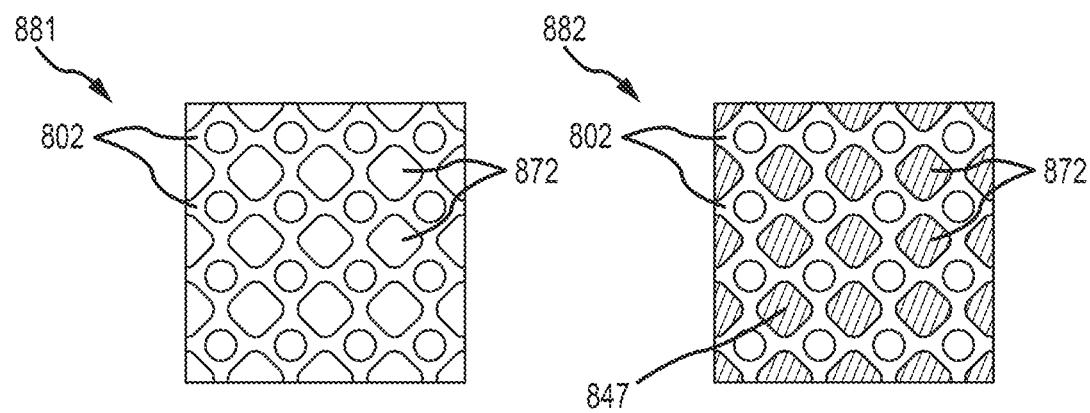
FIGS. 8A, 8B and 8C are schematic views of various embodiments of the noise attenuation panels of the present disclosure illustrating relative performance, in accordance with various embodiments.
Figure 8C:
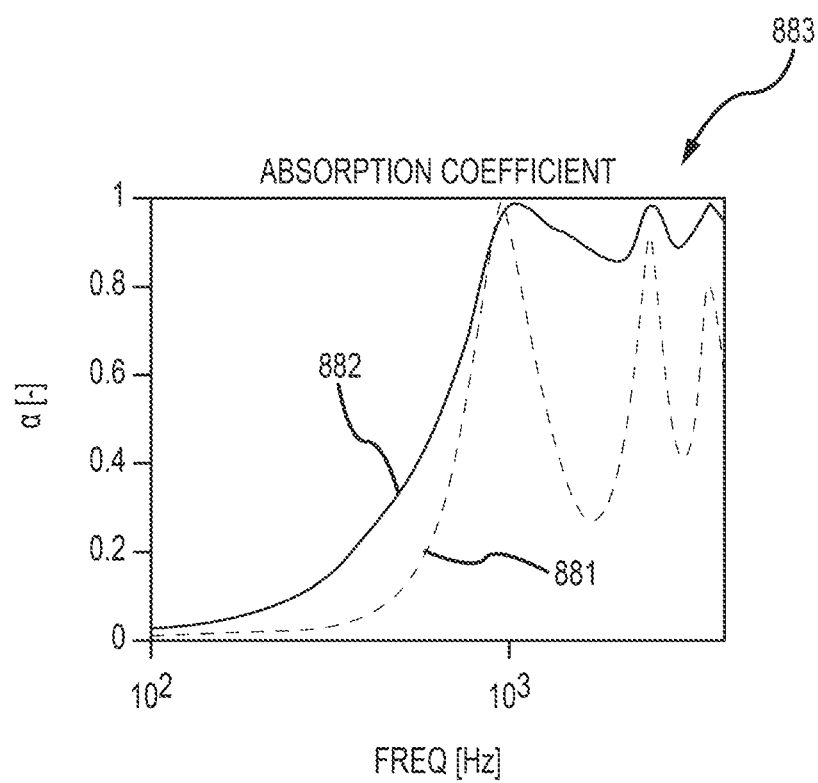

Referring now to FIGS. 8A, 8B and 8C, schematic views of various embodiments of the noise attenuation panels of the present disclosure, and a graph illustrating relative performance, are provided. Referring to FIGS. 8A and 8B, a first noise attenuation panel 881 and a second noise attenuation panel 882 are illustrated. Similar to the various embodiments described above, both the first noise attenuation panel 881 and the second noise attenuation panel 882 include a plurality of unit cells 802 and a plurality of volumes 872 defined by the spaces in between the individual unit cells comprising the plurality of unit cells 802. The only difference between the first noise attenuation panel 881 and the second noise attenuation panel 882 is each of the plurality of volumes 872 in the second noise attenuation panel 882 is partially restricted or completely restricted via a volume filler 847, similar to the volume filler 447 described above. Note that where complete restriction is provided, the volume filler 847 may be completely solid—e.g., the space exterior to the plurality of unit cells 802 is completely filled with material. Referring now to FIG. 8C, a graph 883 showing absorption coefficient as a function of frequency for the first noise attenuation panel 881 and the second noise attenuation panel 882 is provided. As depicted in the graph 883, the second noise attenuation panel 882 exhibits an extended attenuation bandwidth with greater broadband absorption throughout the range of frequencies, which illustrates the enhanced noise absorption characteristics provided by the volume filler 847 used to partially restrict the flow of air through each of the plurality of volumes 872.

Referring now to FIGS. 9A, 9B and 9C, schematic illustrations of a noise attenuation panel 900 are provided, in accordance with various embodiments. Similar to the various embodiments described above, the noise attenuation panel 900 includes a plurality of unit cells 902 sandwiched between a facesheet 904 and a back plate 906. The facesheet 904 typically includes a plurality of perforations or openings 908 to communicate acoustic waves or energy to the plurality of unit cells 902. Each member of the plurality of unit cells 902 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 902 is not repeated here. In various embodiments, the noise attenuation panel 900 includes a gap 909 adjacent the back plate 906 at each of the unit cells positioned adjacent the back plate 906, where the gap 909 provides an opening or spacing away from the back plate 906, thereby allowing fluid communication between the interior of the unit cells positioned adjacent the back plate 906 and the exterior of the unit cells comprising the plurality of unit cells 902.

Referring more particularly now to FIGS. 9B and 9C, and with continued reference to FIG. 9A, a panel section 920 of the noise attenuation panel 900 is illustrated as comprising a single row of unit cells sandwiched between the facesheet 904 and the back plate 906. As illustrated, during operation, acoustic waves or energy impinge upon the facesheet 904 and enter the first unit cell of the panel section 920 via a perforation 903 (or via a plurality of such perforations). The acoustic waves or energy then traverse the plurality of unit cells 902 where acoustic attenuation occurs as described above. In various embodiments, the acoustic waves or energy then exit the interiors of the plurality of unit cells at the gap 909 adjacent the back plate 906. Once exited, the acoustic waves or energy then traverse back to the facesheet 904 via a plurality of volumes 972 defined by the spaces in between the individual unit cells comprising the plurality of unit cells 902. The acoustic waves or energy then may exit the facesheet 904 via the plurality of perforations or openings 908. Note that in various embodiments, one or more or even all of the plurality of perforations or openings 908 may be closed to alter the frequency range of attenuation. In the case where all of the plurality of perforations or openings 908 is completely closed or sealed, it is possible to shift the peak absorption frequency to a lower frequency range than would otherwise occur. In such case, the volume of space exterior to the plurality of unit cells 902—i.e., the plurality of volumes 972—acts as a closed volume or resonator.

Figure 10A:
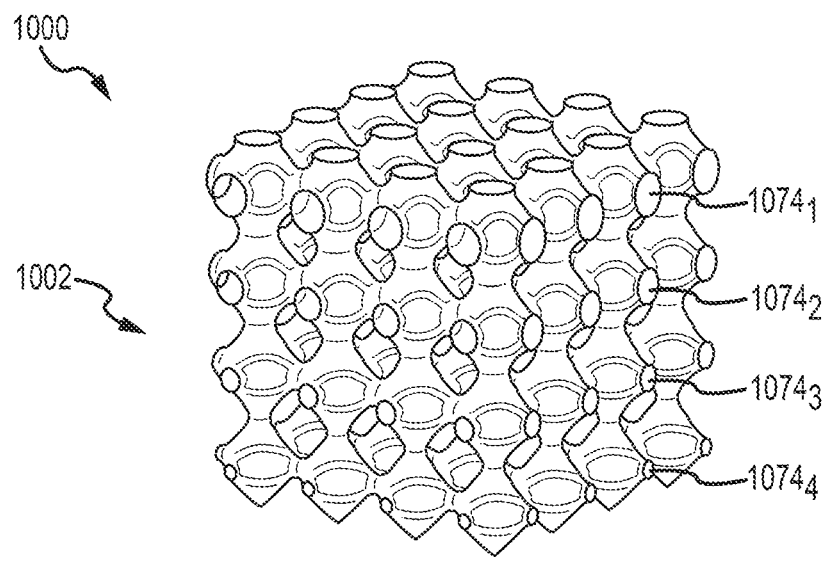
FIGS. 10A, 10B and 10C are schematic illustrations of a noise attenuation panel of the present disclosure, in accordance with various embodiments.
Figure 10B:
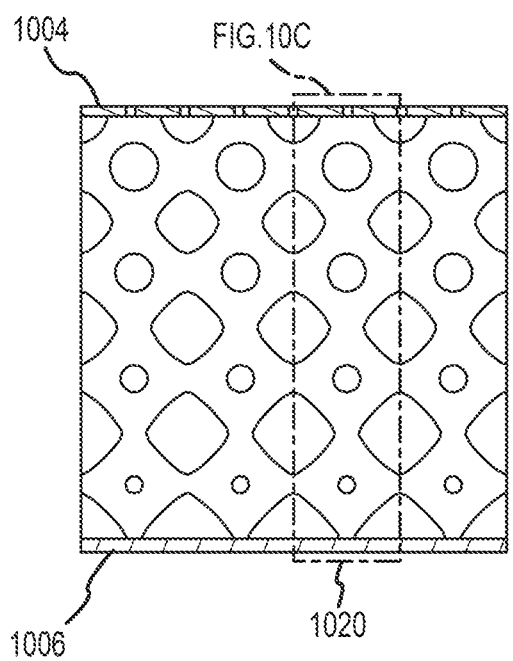
Figure 10C:
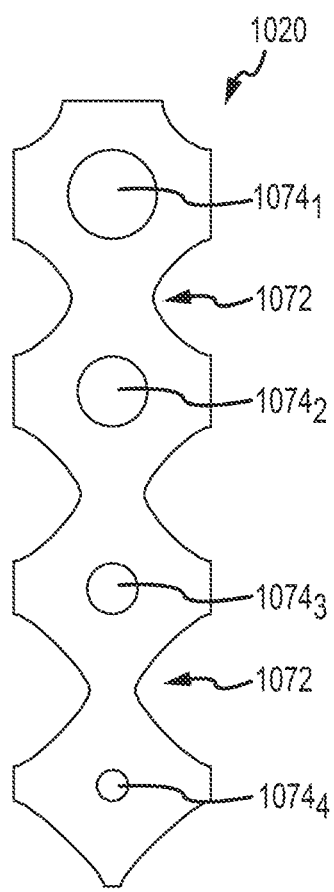

Referring now to FIGS. 10A, 10B and 10C, schematic illustrations of a noise attenuation panel 1000 are provided, in accordance with various embodiments. Similar to the various embodiments described above, the noise attenuation panel 1000 includes a plurality of unit cells 1002 sandwiched between a facesheet 1004 and a back plate 1006. The facesheet 1004 typically includes a plurality of perforations or openings configured to communicate acoustic waves or energy to the plurality of unit cells 1002. Each member of the plurality of unit cells 1002 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1002 is not repeated here. In various embodiments, various members of the plurality of unit cells 1002 exhibit different sizes and, particular to the illustrated embodiment, different sized tubes used to interconnect the unit cells comprising the plurality of unit cells 1002 (e.g., the axial tubes and the lateral tubes described above with reference to the various figures). For example, as illustrated with reference to a panel section 1020, a plurality of lateral tubes includes a first lateral tube $1074_1$, a second lateral tube $1074_2$, a third lateral tube $1074_3$ and a fourth lateral tube $1074_4$, with each of the lateral tubes disposed between and surrounded by various members of a plurality of volumes 1072. Each of the first lateral tube $1074_1$, the second lateral tube $1074_2$, the third lateral tube $1074_3$ and the fourth lateral tube $1074_4$ exhibit a tube size (e.g., a diameter) that decreases from a first tube size associated with the first lateral tube $1074_1$ to a fourth tube size associated with the fourth lateral tube $1074_4$. While the various lateral tubes are illustrated as having tube sizes that decrease in diameter proceeding from the facesheet 1004 to the back plate 1006, the disclosure contemplates alternative embodiments, such as, for example, tube sizes that increase in diameter proceeding from the facesheet 1004 to the back plate 1006 or tube sizes that both decrease and increase in diameter proceeding from the facesheet 1004 to the back plate 1006.

Figure 11A:
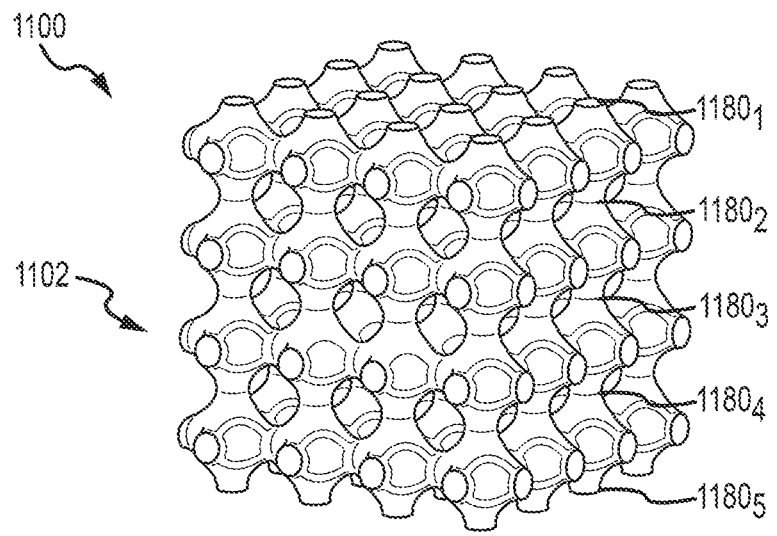
FIGS. 11A, 11B and 11C are schematic illustrations of a noise attenuation panel of the present disclosure, in accordance with various embodiments.
Figure 11B:
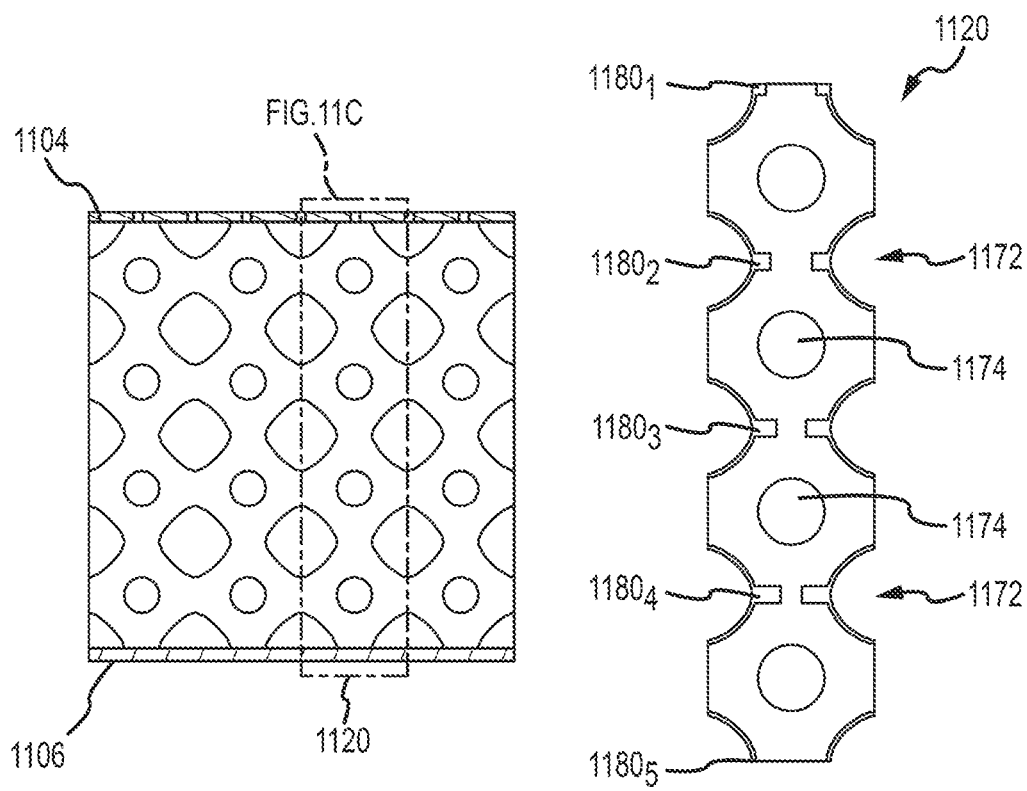
Figure 11C:
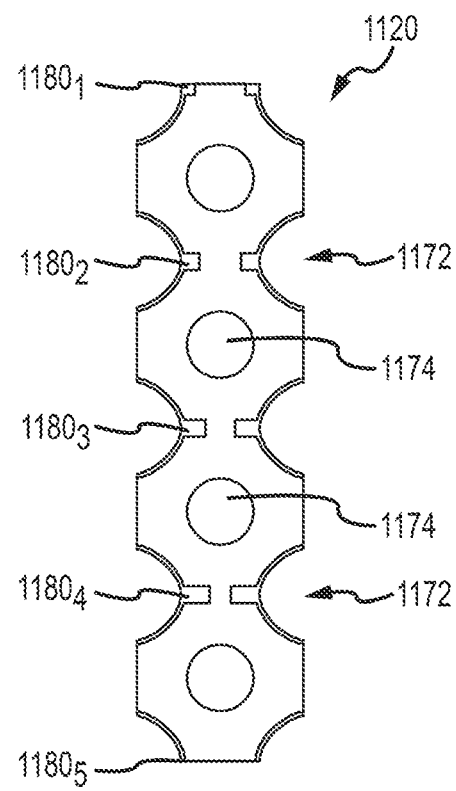

Referring now to FIGS. 11A, 11B and 11C, schematic illustrations of a noise attenuation panel 1100 are provided, in accordance with various embodiments. Similar to the various embodiments described above, the noise attenuation panel 1100 includes a plurality of unit cells 1102 sandwiched between a facesheet 1104 and a back plate 1106. The facesheet 1104 typically includes a plurality of perforations or openings configured to communicate acoustic waves or energy to the plurality of unit cells 1102. Each member of the plurality of unit cells 1102 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1102 is not repeated here. In various embodiments, various of the plurality of unit cells 1102 exhibit different sizes and, particular to the illustrated embodiment, different sized tubes used to interconnect the unit cells comprising the plurality of unit cells 1102 (e.g., the axial tubes and the lateral tubes described above with reference to the various figures). For example, as illustrated with reference to a panel section 1120, a plurality of axial tubes includes a first axial tube $1180_1$, a second axial tube $1180_2$, a third axial tube $1080_3$, and a fourth axial tube $1180_4$, with each of the axial tubes disposed between and surrounded by various members of a plurality of volumes 1172. Each of the first axial tube $1180_1$, the second axial tube $1180_2$, the third axial tube $1080_3$ and the fourth axial tube $1180_4$ exhibit a tube size (e.g., a diameter) that decreases from a first tube size associated with the first axial tube $11801$ to a fourth tube size associated with the fourth axial tube $11804$. The panel section terminates at a fifth axial tube $1180_5$, which may be positioned adjacent the back plate 1106. While the various tubes are illustrated as having tube sizes that decrease in diameter from the facesheet 1104 to the back plate 1106, the disclosure contemplates alternative embodiments, such as, for example, tube sizes that increase in diameter from the facesheet 1104 to the back plate 1106 or tube sizes that both decrease and increase in diameter from the facesheet 1104 to the back plate 1106. Further, while the illustrations show an outer diameter or exterior of each axial tube being sized the same, with the internal diameter having different sizes (e.g., progressively decreasing internal diameters from the first tube size to the fourth tube size), the disclosure contemplates size variations of the exteriors of the axial tubes to vary in the same or a similar manner as the above-described lateral tubes.

Figure 12A:
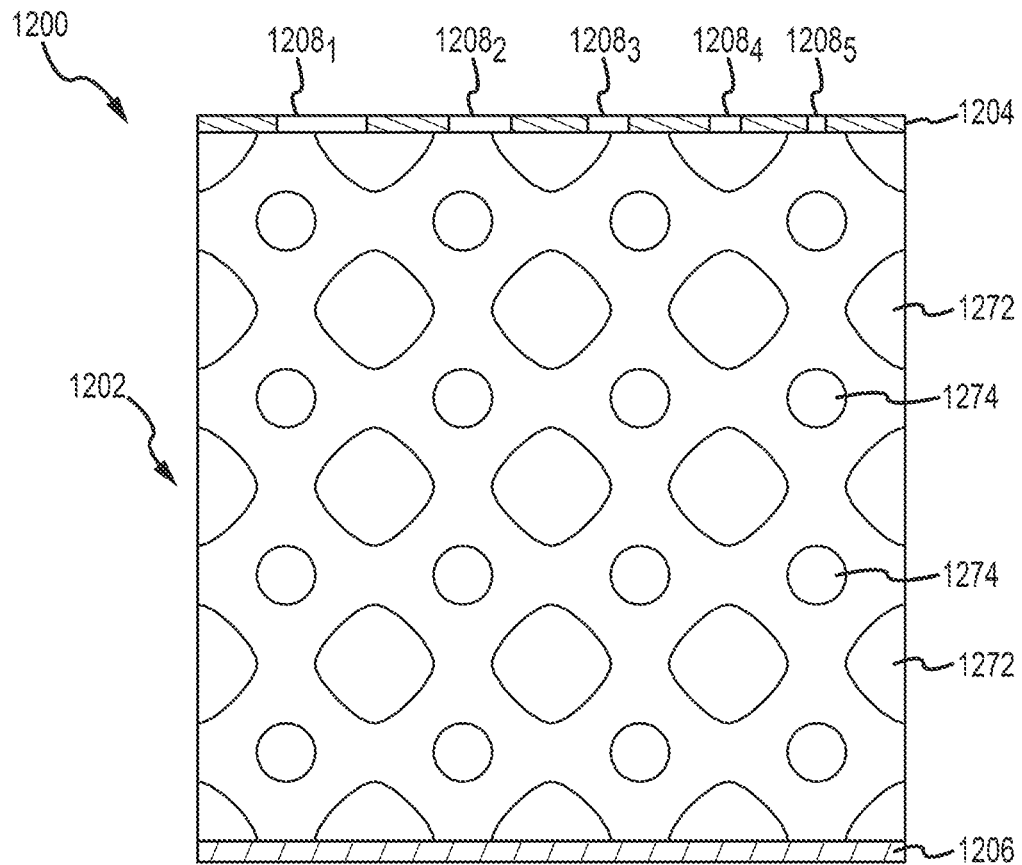
FIGS. 12A and 12B are schematic illustrations of a noise attenuation panel of the present disclosure, in accordance with various embodiments.
Figure 12B:
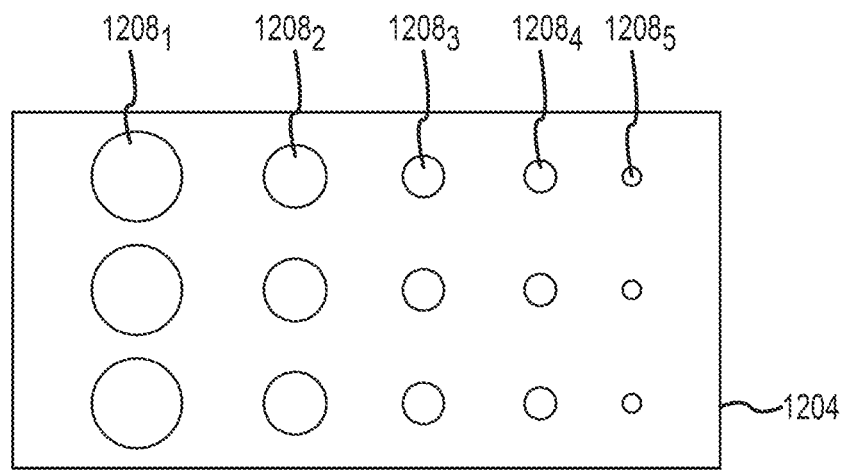

Referring now to FIGS. 12A and 12B, schematic illustrations of a noise attenuation panel 1200 are provided, in accordance with various embodiments. Similar to the various embodiments described above, the noise attenuation panel 1200 includes a plurality of unit cells 1202 sandwiched between a facesheet 1204 and a back plate 1206. The facesheet 1204 typically includes a plurality of perforations or openings configured to communicate acoustic waves or energy to the plurality of unit cells 1202. Each member of the plurality of unit cells 1202 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1202 is not repeated here. In various embodiments, the plurality of perforations or openings in the facesheet 1204 exhibit different sizes. For example, as illustrated with reference to FIGS. 12A and 12B, the facesheet 1204 includes a first perforation $1208_1$, a second perforation $1208_2$, a third perforation $1208_3$, a fourth perforation $1208_4$ and a fifth perforation $1208_5$. Each of the first perforation $1208_1$, the second perforation $1208_2$, the third perforation $1208_3$, the fourth perforation $1208_4$ and the fifth perforation $1208_5$ exhibit a perforation size (e.g., a diameter) that decreases from a first perforation size associated with the first perforation $1208_1$ to a fifth perforation size associated with the fifth perforation $1208_5$. While the various perforations are illustrated as having perforation sizes that decrease in diameter proceeding from a left side (or an upstream side) of the facesheet 1204 to a right side (or a downstream side) of the facesheet 1204, the disclosure contemplates alternative embodiments, such as, for example, perforation sizes that increase in diameter proceeding from the left side of the facesheet 1204 to the right side of the facesheet 1204, or perforation sizes that both decrease and increase in diameter proceeding from the left side of the facesheet 1204 to the right side of the facesheet 1204.

Figure 13:
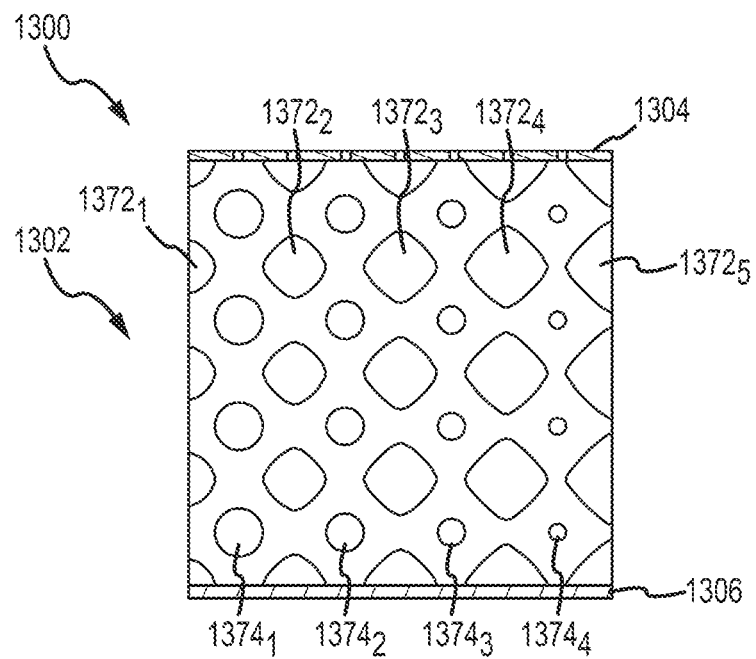
FIG. 13 is a schematic illustration of a noise attenuation panel of the present disclosure, in accordance with various embodiments.

Referring now to FIG. 13, a schematic illustration of a noise attenuation panel 1300 is provided, in accordance with various embodiments. Similar to the various embodiments described above, the noise attenuation panel 1300 includes a plurality of unit cells 1302 sandwiched between a facesheet 1304 and a back plate 1306. The facesheet 1304 typically includes a plurality of perforations or openings configured to communicate acoustic waves or energy to the plurality of unit cells 1302. Each member of the plurality of unit cells 1302 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1302 is not repeated here. In various embodiments, various of the plurality of unit cells 1302 exhibit different sizes and, particular to the illustrated embodiment, different sized tubes used to interconnect the unit cells comprising the plurality of unit cells 1302 (e.g., the axial tubes and the lateral tubes described above with reference to the various figures) and different sized volumes that surround the exterior surfaces of the unit cells comprising the plurality of unit cells 1302.

For example, a plurality of lateral tubes includes a first lateral tube $1374_1$, a second lateral tube $1374_2$, a third lateral tube $1374_3$ and a fourth lateral tube $1374_4$. Each of the first lateral tube $1374_1$, the second lateral tube $1374_2$, the third lateral tube $1374_3$ and the fourth lateral tube $1374_4$ exhibit a tube size (e.g., a diameter) that decreases from a first tube size associated with the first lateral tube $1374_1$ to a fourth tube size associated with the fourth lateral tube $1374_4$. While the various lateral tubes are illustrated as having tube sizes that decrease in diameter proceeding from a left side (or an upstream side) of the noise attenuation panel 1300 to a right side (or a downstream side) of the noise attenuation panel 1300, the disclosure contemplates alternative embodiments, such as, for example, tube sizes that increase in diameter proceeding from the left side of the noise attenuation panel 1300 to the right side of the noise attenuation panel 1300, or tube sizes that both decrease and increase in diameter proceeding from the left side of the noise attenuation panel 1300 to the right side of the noise attenuation panel 1300.

Still referring to FIG. 13, the volumes that surround the exterior surfaces of the unit cells exhibit different sizes. For example, a plurality of volumes includes a first volume $1372_1$, a second volume $1372_2$, a third volume $1372_3$, a fourth volume $1372_4$ and a fifth volume $1372_5$. Each of the first volume $1372_1$, the second volume $1372_2$, the third volume $1372_3$, the fourth volume $1372_4$ and the fifth volume $1372_5$ exhibit a volume size (e.g., a characteristic dimension) that increases from a first volume size associated with the first volume $1372_1$, to a second volume size associated with the second volume $1372_2$ . . . to a fifth volume size associated with the fifth volume $1372_5$. While the various volumes are illustrated as having volume sizes that increase in characteristic dimension proceeding from a left side (or an upstream side) of the noise attenuation panel 1300 to a right side (or a downstream side) of the noise attenuation panel 1300, the disclosure contemplates alternative embodiments, such as, for example, volume sizes that decrease in characteristic dimension proceeding from the left side of the noise attenuation panel 1300 to the right side of the noise attenuation panel 1300, or volume sizes that both decrease and increase in characteristic dimension proceeding from the left side of the noise attenuation panel 1300 to the right side of the noise attenuation panel 1300. Note that where the volumes comprising the plurality of volumes are of varying or different sizes, in general, the unit cells comprising the plurality of unit cells that define the various volumes will also be of different sizes (e.g., where one or more of a first unit cell size, a second unit cell size, a third unit cell size or a fourth unit cell size exhibits a different characteristic dimension or dimensions from that of its neighboring unit cells).

Figure 14:
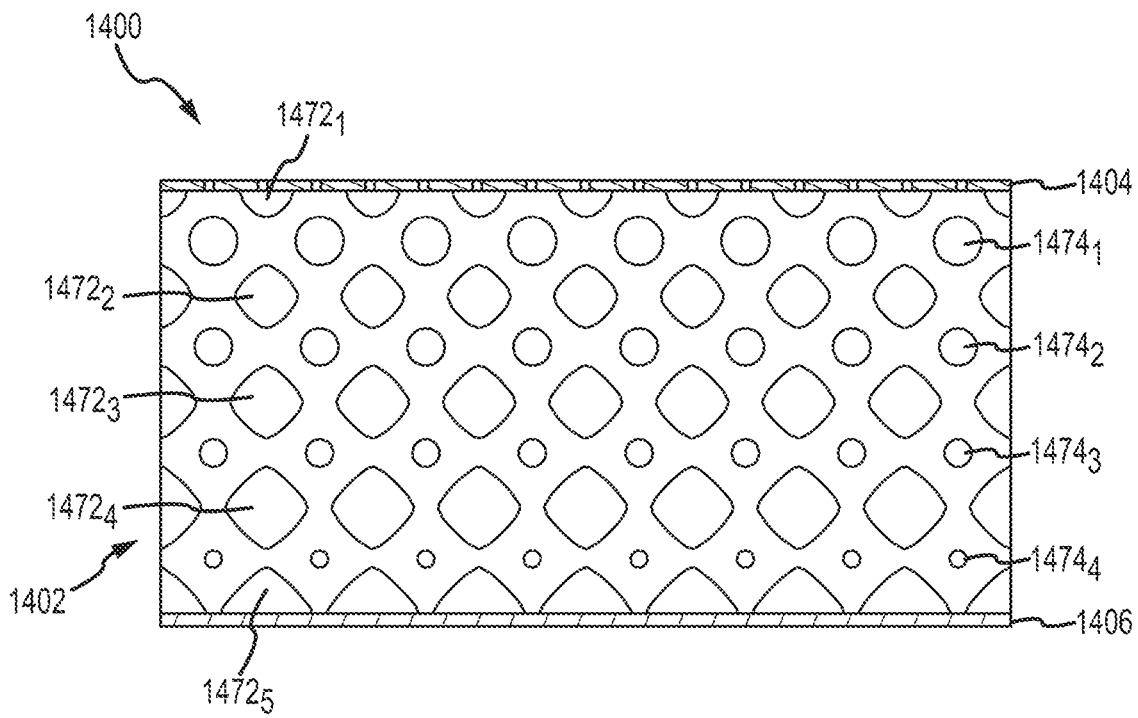
FIG. 14 is a schematic illustration of a noise attenuation panel of the present disclosure, in accordance with various embodiments.

Referring now to FIG. 14, a schematic illustration of a noise attenuation panel 1400 is provided, in accordance with various embodiments. Similar to the various embodiments described above, the noise attenuation panel 1400 includes a plurality of unit cells 1402 sandwiched between a facesheet 1404 and a back plate 1406. The facesheet 1404 typically includes a plurality of perforations or openings configured to communicate acoustic waves or energy to the plurality of unit cells 1402. Each member of the plurality of unit cells 1402 has properties and characteristics similar to the unit cell 202 and to the plurality of unit cells 232 described above with reference to FIGS. 2A and 2B, and so such properties and characteristics, including the manner of interconnecting the unit cells within the plurality of unit cells 1402 is not repeated here. In various embodiments, various of the plurality of unit cells 1402 exhibit different sizes and, particular to the illustrated embodiment, different sized tubes used to interconnect the unit cells comprising the plurality of unit cells 1402 (e.g., the axial tubes and the lateral tubes described above with reference to the various figures) and different sized volumes that surround the exterior surfaces of the unit cells comprising the plurality of unit cells 1302.

For example, a plurality of lateral tubes includes a first lateral tube $1474_1$, a second lateral tube $1474_2$, a third lateral tube $1474_3$ and a fourth lateral tube $1474_4$. Each of the first lateral tube $1474_1$, the second lateral tube $1474_2$, the third lateral tube $1474_3$ and the fourth lateral tube $1474_4$ exhibit a tube size (e.g., a diameter) that decreases from a first tube size associated with the first lateral tube $1474_1$ to a fourth tube size associated with the fourth lateral tube $1474_4$. While the various lateral tubes are illustrated as having tube sizes that decrease in diameter proceeding from the facesheet 1404 to the back plate 1406, the disclosure contemplates alternative embodiments, such as, for example, tube sizes that increase in diameter proceeding from the facesheet 1404 to the back plate 1406 or tube sizes that both decrease and increase in diameter proceeding from the facesheet 1404 to the back plate 1406.

Still referring to FIG. 14, the volumes that surround the exterior surfaces of the unit cells exhibit different sizes. For example, a plurality of volumes includes a first volume $1472_1$, a second volume $1472_2$, a third volume $1472_3$, a fourth volume $1472_4$ and a fifth volume $1472_5$. Each of the first volume $1472_1$, the second volume $1472_2$, the third volume $1472_3$, the fourth volume $1472_4$ and the fifth volume $1472_5$ exhibit a volume size (e.g., a characteristic dimension) that increases from a first volume size associated with the first volume $1472_1$ to a fifth volume size associated with the fifth volume $1472_5$. While the various volumes are illustrated as having volume sizes that increase in characteristic dimension proceeding from the facesheet 1404 to the back plate 1406, the disclosure contemplates alternative embodiments, such as, for example, volume sizes that decrease in characteristic dimension proceeding from the facesheet 1404 to the back plate 1406 or volume sizes that both decrease and increase in characteristic dimension proceeding from the facesheet 1404 to the back plate 1406.

Figure 15A:
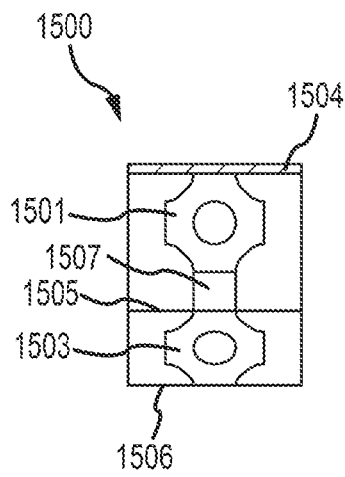
FIGS. 15A, 15B, 15C, 15D and 15E are schematic illustrations of various unit cell arrangements for a noise attenuation panel of the present disclosure, in accordance with various embodiments.

Referring now to FIGS. 15A, 15B, 15C, 15D and 15E, schematic views of various noise attenuation panels (or acoustic attenuation structures) are provided; the noise attenuation panels described and illustrated in these figures are oversimplified to explain various features of the panels, but the disclosure contemplates that any or all of the various acoustic attenuation structures illustrated in FIGS. 15A-15E may be incorporated into the noise attenuation panels described above and below. Referring, for example, to FIG. 15A, a noise attenuation panel 1500 is illustrated having a first unit cell 1501 and a second unit cell 1503 sandwiched between a facesheet 1504 and a back plate 1506. The facesheet 1504 typically includes a plurality of perforations or openings to communicate acoustic waves or energy to the first unit cell 1501 and then to the second unit cell 1503, which together act as a resonator to damp or attenuate the acoustic waves or energy. The back plate 1506 typically is non-perforated and, together with the facesheet 1504, provides a support structure for the noise attenuation panel 1500. In various embodiments, a septum 1505 separates the first unit cell 1501 and the second unit cell 1503, with the septum 1505 including a plurality of perforations or openings to communicate acoustic waves or energy between the first unit cell 1501 and the second unit cell 1503. In various embodiments, a connector 1507 (e.g., a tubular member) is used to connect the first unit cell 1501 and the second unit cell 1503, with the septum 1505 being disposed between the connector 1507 and the second unit cell 1503. Note, as illustrated, the first unit cell 1501 and the second unit cell 1503 may exhibit different shapes or sizes to further assist in tuning the noise attenuation panel 1500.

Figure 15B:
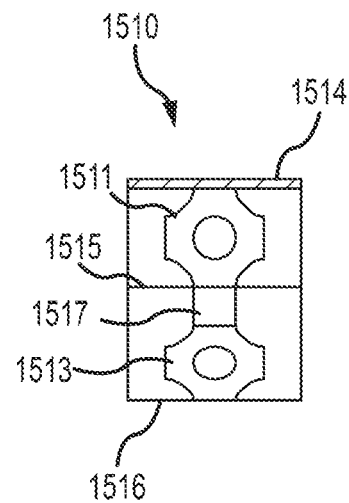

Referring now to FIG. 15B, a noise attenuation panel 1510 is illustrated having a first unit cell 1511 and a second unit cell 1513 sandwiched between a facesheet 1514 and a back plate 1516. The facesheet 1514 typically includes a plurality of perforations or openings to communicate acoustic waves or energy to the first unit cell 1511 and then to the second unit cell 1513, which together act as a resonator to damp or attenuate the acoustic waves or energy. The back plate 1516 typically is non-perforated and, together with the facesheet 1514, provides a support structure for the noise attenuation panel 1510. In various embodiments, a septum 1515 separates the first unit cell 1511 and the second unit cell 1513, with the septum 1515 including a plurality of perforations or openings to communicate acoustic waves or energy between the first unit cell 1511 and the second unit cell 1513. In various embodiments, a connector 1517 (e.g., a tubular member) is used to connect the first unit cell 1511 and the second unit cell 1513, with the septum 1515 being disposed between the connector 1517 and the first unit cell 1511.

Figure 15C:
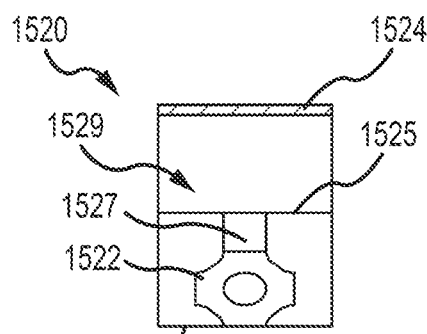

Referring now to FIG. 15C, a noise attenuation panel 1520 is illustrated having a unit cell 1522, a facesheet 1524, a back plate 1526 and a septum 1525. The facesheet 1524 typically includes a plurality of perforations or openings to communicate acoustic waves or energy to an open chamber 1529 and then to the unit cell 1522, which together act as a resonator to damp or attenuate the acoustic waves or energy. The back plate 1526 typically is non-perforated and, together with the facesheet 1524, provides a support structure for the noise attenuation panel 1520. In various embodiments, the septum 1525 separates the unit cell 1522 and the open chamber 1529, with the septum 1525 including a plurality of perforations or openings to communicate acoustic waves or energy between the unit cell 1522 and the open chamber 1529. In various embodiments, a connector 1527 (e.g., a tubular member) is used to connect the unit cell 1522 and the open chamber 1529, with the septum 1525 being disposed between the connector 1527 and the open chamber 1529.

Figure 15D:
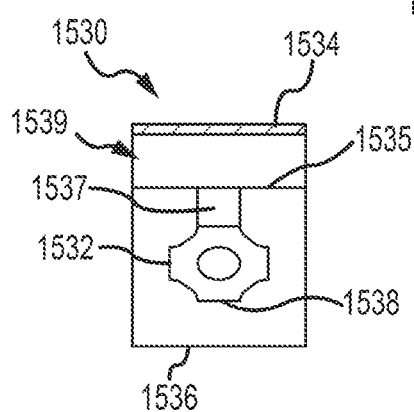

Referring now to FIG. 15D, a noise attenuation panel 1530 is illustrated having a unit cell 1532, a facesheet 1534, a back plate 1536 and a septum 1535. The facesheet 1534 typically includes a plurality of perforations or openings to communicate acoustic waves or energy to an open chamber 1539 and then to the unit cell 1532, which together act as a resonator to damp or attenuate the acoustic waves or energy. The back plate 1536 typically is non-perforated and, together with the facesheet 1534, provides a support structure for the noise attenuation panel 1530. In various embodiments, the septum 1535 separates the unit cell 1532 and the open chamber 1539, with the septum 1535 including a plurality of perforations or openings to communicate acoustic waves or energy between the unit cell 1532 and the open chamber 1539. In various embodiments, a connector 1537 (e.g., a tubular member) is used to connect the unit cell 1532 and the open chamber 1539, with the septum 1535 being disposed between the connector 1537 and the open chamber 1539. Note, in contrast with the noise attenuation panel 1520, the unit cell 1532 may not, in various embodiments, have a tube (e.g., a lateral tube 1538) in contact with the back plate 1536.

Figure 15E:
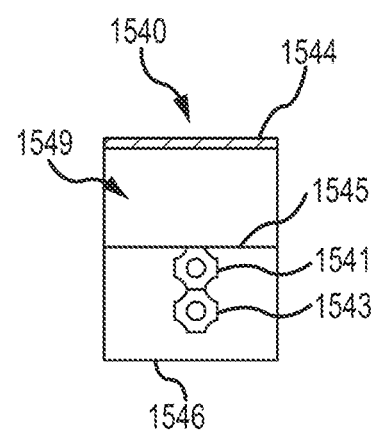

Referring now to FIG. 15E, a noise attenuation panel 1540 is illustrated having a first unit cell 1541, a second unit cell 1543, a facesheet 1544, a back plate 1546 and a septum 1545. The facesheet 1544 typically includes a plurality of perforations or openings to communicate acoustic waves or energy to an open chamber 1549 and then to the first unit cell 1541 and to the second unit cell 1543, which together act as a resonator to damp or attenuate the acoustic waves or energy. The back plate 1546 typically is non-perforated and, together with the facesheet 1544, provides a support structure for the noise attenuation panel 1540. In various embodiments, the septum 1545 separates the first unit cell 1541 and the open chamber 1549, with the septum 1545 including a plurality of perforations or openings to communicate acoustic waves or energy between the first unit cell 1541 and the open chamber 1549. Note, in contrast with, for example, the noise attenuation panel 1510, the noise attenuation panel 1520, the noise attenuation panel 1530, and the noise attenuation panel 1540, the first unit cell 1541 and the second unit cell 1543 are smaller in comparison to the sizes of the unit cells comprising the previous attenuation panels, thereby allowing for attenuation of noise at relatively higher frequencies.

Figure 16A:
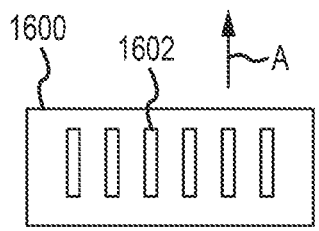
FIGS. 16A, 16B, 16C and 16D are schematic illustrations of various facesheets or septa or perforate structures for a noise attenuation panel of the present disclosure, in accordance with various embodiments.
Figure 16B:
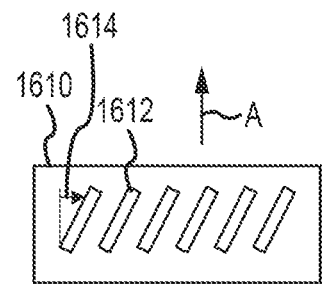
Figure 16C:
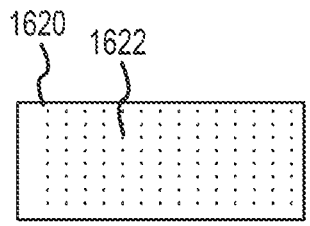
Figure 16D:
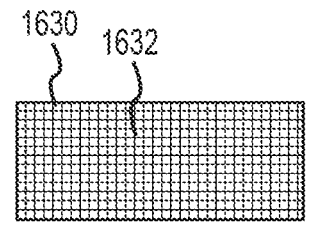
Figure 18B:
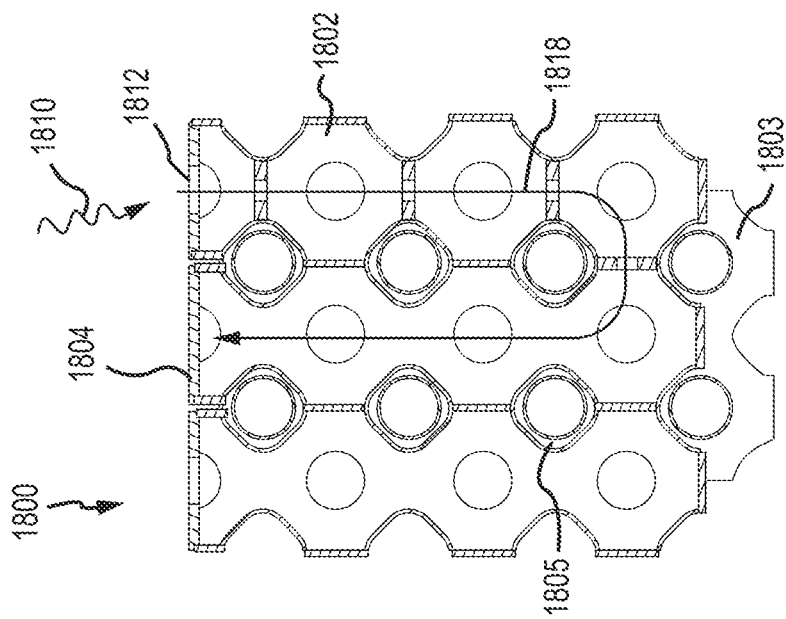
Figure 18A:
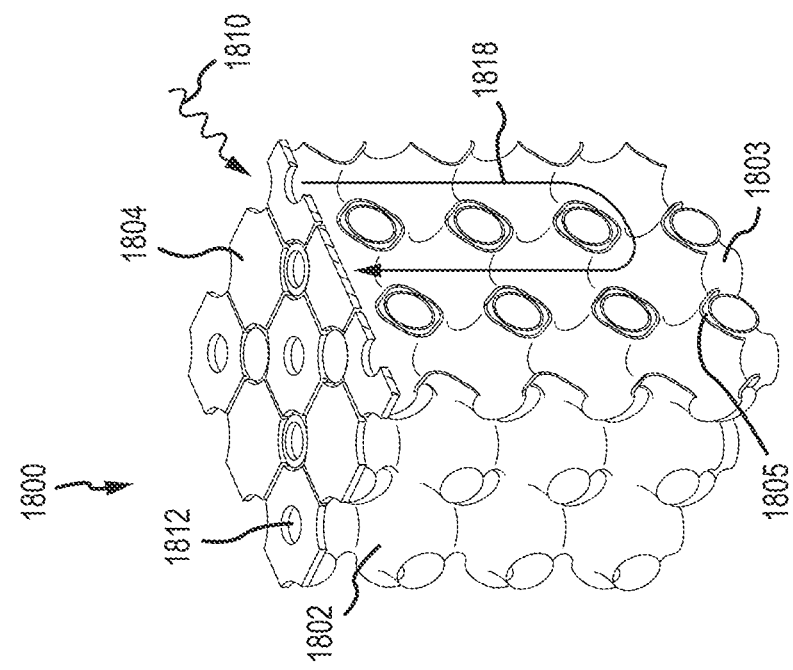
Figure 18D:
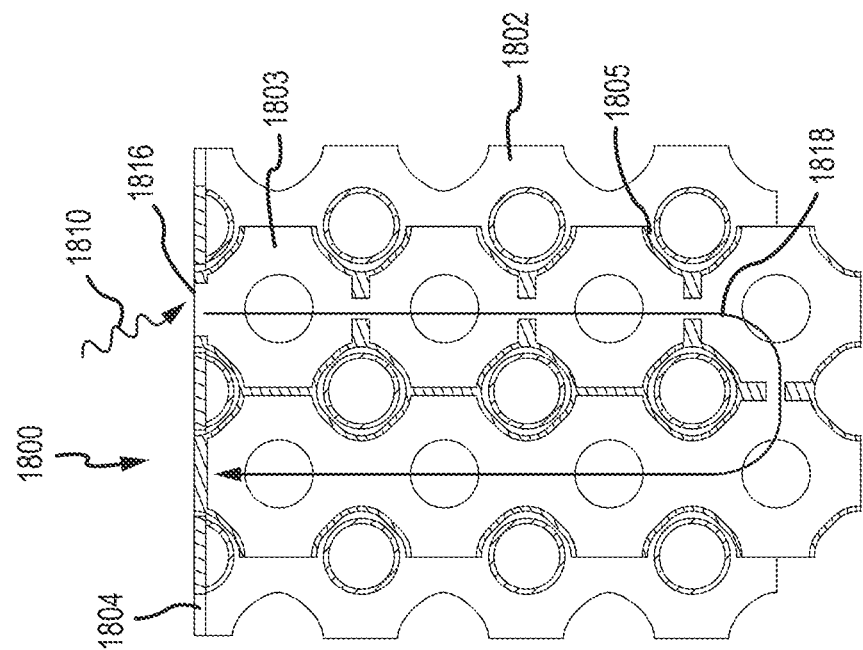
Figure 18C:
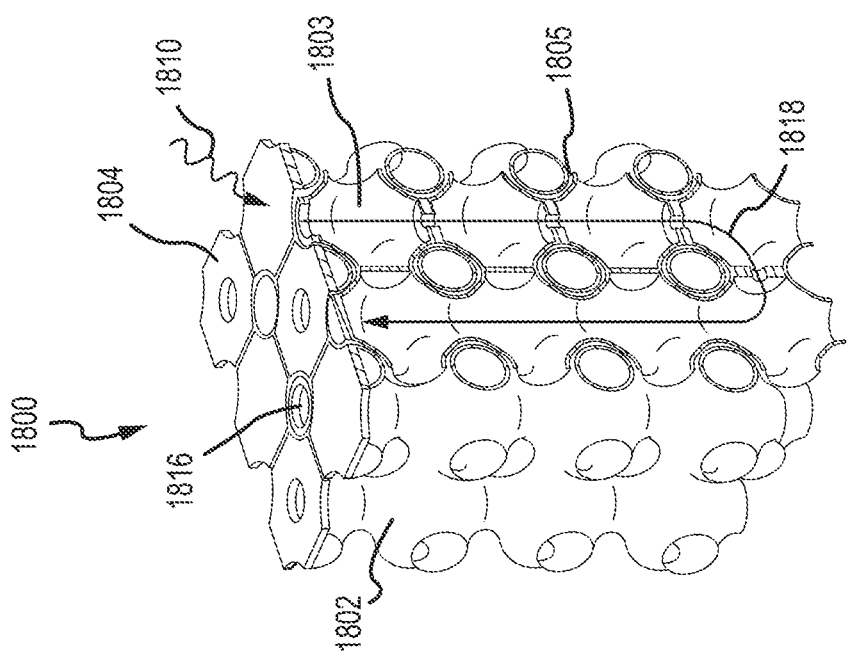

Referring briefly now to FIGS. 16A, 16B, 16C and 16D, schematic views of various structures used for the facesheets and septa and other perforated structures described throughout the disclosure are provided. Referring to FIG. 16A, for example, a perforated structure 1600 (e.g., a facesheet or a septum) includes a slot 1602 (or a plurality of slots) that is aligned in a generally axial direction with respect to a longitudinal axis A. In various embodiments, the slot 1602 exhibits an aspect ratio that may vary from a generally square-shaped configuration (e.g., 1:1 aspect ratio) to an elongated rectangular-shaped configuration (e.g., 10:1 aspect ratio). Referring to FIG. 16B, a perforated structure 1610 includes a slot 1612 (or a plurality of slots) that is aligned in a generally non-axial direction (or angled direction) with respect to a longitudinal axis A. In various embodiments, the slot 1612 exhibits an aspect ratio that may vary from a generally square-shaped configuration (e.g., 1:1 aspect ratio) to an elongated rectangular-shaped configuration (e.g., 10:1 aspect ratio). Further, the disclosure contemplates the non-axial direction may exhibit an angle 1614 with respect to the axial direction from plus ninety degrees (+90°) to minus ninety degrees (−90°). Referring to FIG. 16C, a perforated structure 1620 includes a plurality of perforations 1622 (e.g., circular holes) spaced about the surface of the perforated structure 1620. The plurality of perforations 1622 may exhibit a regular spacing (as illustrated) or a non-regular orientation. Referring to FIG. 16D, a perforated structure 1630 includes a mesh structure 1632. In various embodiments, the mesh structure 1632 may be formed by weaving various materials to have warp and weft interaction (e.g., longitudinal warp materials interwoven with transverse weft materials). Without loss of generality, each of the perforated structures just described may exhibit various percent openings with respect to the non-open portions of the perforated structures. For example, in various embodiments, the percent openings may range from about two percent (2%) to about ninety percent (90%) or any range of values therebetween.

The foregoing disclosure provides an acoustic metamaterial (e.g., a material engineered to have a property or properties not found in naturally occurring materials) consisting of a periodic lattice structure made of a unit cell bulb-like structure that divides a space into two or more separated but intertwined fluid networks (e.g., the volumes and the tubes described above). The fluid networks are locally coupled at the junctions of the lattice structure to create arrays of resonator networks. The resonator networks may be varied in length, width or height to satisfy particular target frequencies for maximum sound absorption or attenuation. Distributed networks of various dimensions may be constructed for broadband absorption. Hybrid concepts include various forms of restrictions or space fillers for tuning the resulting noise attenuation panel. These space-fillers can act as bulk absorbers to extend the bandwidth and frequency range of acoustic attenuation or they can be partially or completely solid (or filled) for improved structural performance. Further, the unit cells may be constructed of different forms, sizes or shapes or may have similar, repeating shapes of the same size, such as, for example, including the Schwarz P periodic minimal surface. Advantageously, the various resonator networks, including networks exhibiting repeating and identically shaped unit cells, or networks exhibiting non-repeating and non-identically shaped unit cells, or networks comprising various restrictions (complete or partial) distributed throughout various tubes or volumes described above, may be fabricated using additive manufacturing techniques and dynamically modeled via acoustic performance analysis prior to manufacture. Other benefits of the disclosure include noise attenuation panels exhibiting greater damping or attenuation per unit volume as compared to conventional honeycomb liners. This benefit translates into potential weight reduction or fuel savings over existing technology. The noise attenuation panels described herein also provides an ability to replace conventional structural honeycomb liners with liners having better attenuation and structural properties. Additional embodiments of noise attenuation panels that include many of the features described above are described below, followed by applications in various combustors for gas turbine engines.

Referring now to FIGS. 17A, 17B, 17C and 17D, schematic illustrations of various components of a noise attenuation panel 1700 are provided. The noise attenuation panel 1700 (FIG. 17D) is illustrated as having a first plurality of unit cells 1702 (FIG. 17B) and a second plurality of unit cells 1703 (FIG. 17A) merged within the first plurality of unit cells 1702. More specifically, the first plurality of unit cells 1702 takes the form, for example, of the first plurality of unit cells 302 described above with reference to FIG. 3A and includes a plurality of volumes 1772 disposed between the unit cells, similar to the plurality of volumes 372 described above with reference to FIG. 3B. The second plurality of unit cells 1703 is merged within the first plurality of unit cells 1702 by disposing a unit cell (from the second plurality of unit cells 1703) within a volume (from the plurality of volumes 1772), such that each of the plurality of volumes 1772 has a unit cell disposed within its interior space. In addition, the size of the exterior surface of each unit cell disposed within the second plurality of unit cells 1703 is sized smaller than the corresponding volume within which the unit cell resides or is disposed. The relative sizing provides a space between the exterior surfaces of the first plurality of unit cells 1702 and second plurality of unit cells 1703. The spacing provides a flow path 1705 (FIG. 3C) or a cooling fluid flow path for a cooling fluid to flow between the exterior surfaces of the first plurality of unit cells 1702 and the second plurality of unit cells 1703. To be clear, each of the first plurality of unit cells 1702 and the second plurality of unit cells 1703 is a solid lattice structure while the flow path 1705 is a fluid lattice structure (e.g., an open spacing or volume between the first plurality of unit cells 1702 and the second plurality of unit cells 1703). In various embodiments, the open spacing or volume is attributable to the additive manufacturing process used to construct the noise attenuation panel 1700, whereby the first plurality of unit cells 1702 and the second plurality of unit cells 1703 are constructed simultaneously with the flow path 1705 resulting thereby.

During operation, acoustic waves or energy 1710 impinge upon the noise attenuation panel 1700 (e.g., upon a facesheet 1704 of the noise attenuation panel 1700). The acoustic waves or energy enter a first plurality of axial tubes 1712 of the first plurality of unit cells 1702 and traverse the interiors of the various unit cells as indicated by a first noise attenuation flow path 1714. Similarly, the acoustic waves or energy 1710 enter a second plurality of axial tubes 1716 of the second plurality of unit cells 1703 and traverse the interiors of the various unit cells as indicated by a second noise attenuation flow path 1718. At the same time, a cooling fluid traverses the flow path 1705 between the first plurality of unit cells 1702 and the second plurality of unit cells 1703 as indicated by a cooling fluid flow path 1720. Further operational details are provided in the drawings that follow to clarify operation of the noise attenuation panel 1700. Note that while the disclosure describes the cooling fluid traversing the flow path 1705, the disclosure contemplates other manners of cooling the noise attenuation panel 1700. For example, in various embodiments, the cooling fluid may be introduced directly through the interior of a single one of the first plurality of unit cells 1702 and the second plurality of unit cells 1703, while the other of the first plurality of unit cells 1702 and the second plurality of unit cells 1703 is used for noise attenuation.

Referring now to FIGS. 18A, 18B, 18C, 18D, 18E, 18F and 18G, a noise attenuation panel 1800, similar to the noise attenuation panel 1700, is illustrated. The noise attenuation panel 1800 includes a first plurality of unit cells 1802 and a second plurality of unit cells 1803 merged within the first plurality of unit cells 1802 with a flow path 1805 existing between the exterior surfaces of the first plurality of unit cells 1802 and the second plurality of unit cells 1803. During operation (referring to FIGS. 18A and 18B), acoustic waves or energy 1810 impinge upon the noise attenuation panel 1800 (e.g., upon a facesheet 1804 of the noise attenuation panel 1800). The acoustic waves or energy enter a first plurality of axial tubes 1812 of the first plurality of unit cells 1802 and traverse the interiors of the various unit cells as indicated by a first noise attenuation flow path 1818 Similarly (referring to FIGS. 18C and 18D), the acoustic waves or energy 1810 enter a second plurality of axial tubes 1816 of the second plurality of unit cells 1803 and traverse the interiors of the various unit cells as indicated by a second noise attenuation flow path 1818. At the same time (referring to FIGS. 18E, 18F and 18G), a cooling fluid traverses the flow path 1805 between the first plurality of unit cells 1802 and the second plurality of unit cells 1803 as indicated by a cooling fluid flow path 1820, which, in various embodiments, completely fills the volume of space exiting between the exterior surfaces of the first plurality of unit cells 1802 and the second plurality of unit cells 1803. Benefits of the dual noise attenuation flow paths and cooling fluid flow path, based on the differing sizes of the unit cells comprising the first plurality of unit cells 1802 and the second plurality of unit cells 1803, include being able to cool the two pluralities of unit cells and the ability to attenuate different frequency ranges within the acoustic waves or energy 1810, with the larger of the unit cells (e.g., the first plurality of unit cells 1802) attenuating lower frequencies than the smaller of the unit cells (e.g., the second plurality of unit cells 1803).

Figure 19A:
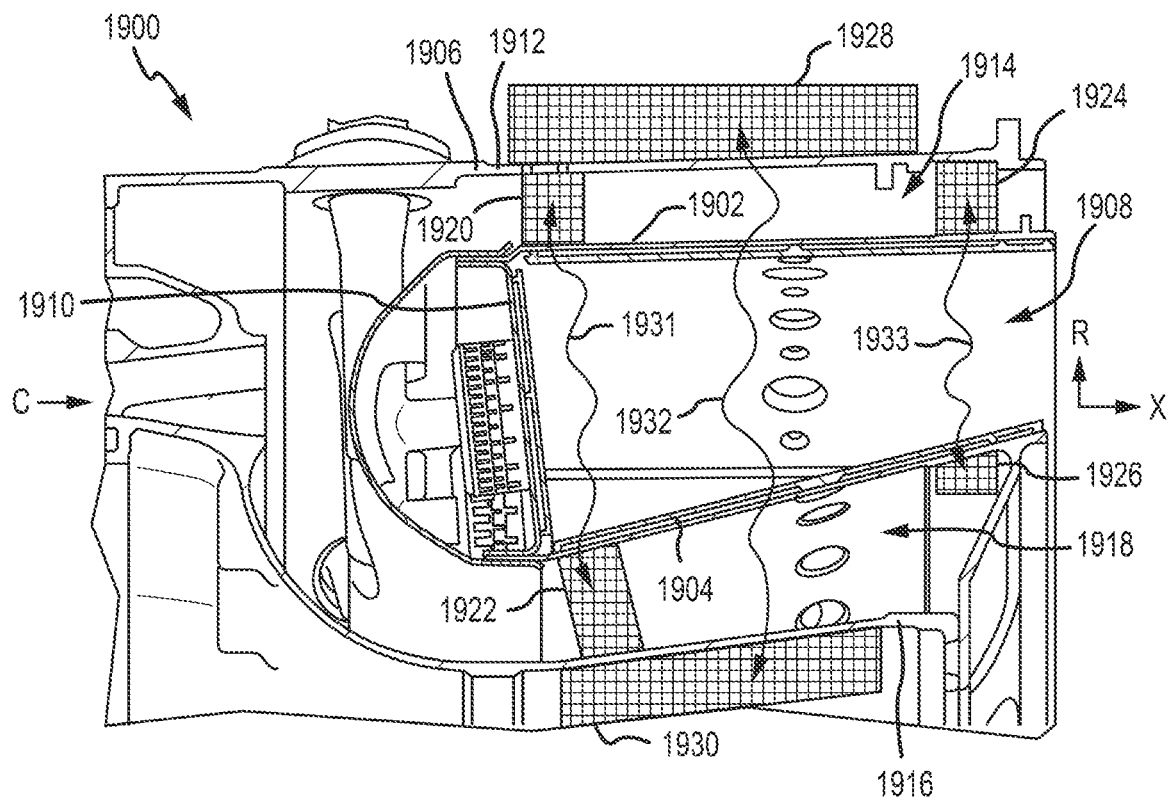
FIGS. 19A, 19B, 19C and 19D are schematic illustrations of a combustor having a noise attenuation panel, in accordance with various embodiments.
Figure 19B:
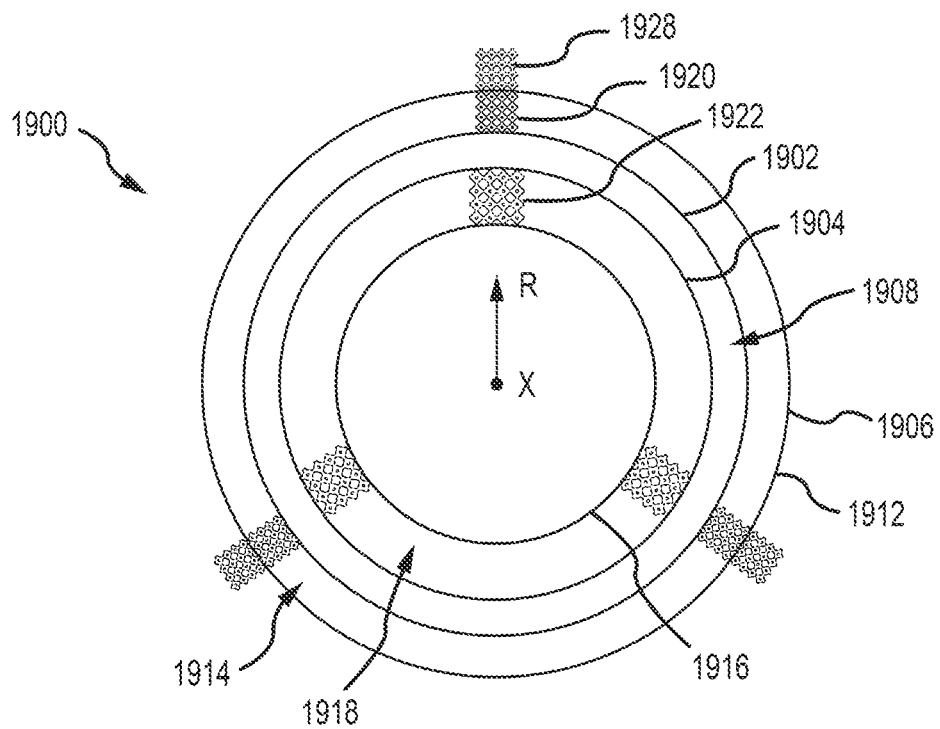

Referring now to FIGS. 19A, 19B, 19C and 19D, cross-sectional and axial views of a combustor 1900, similar to the combustor section 112 described above with reference to FIG. 1 are provided. Referring more specifically to FIGS. 19A and 19B, in various embodiments, the combustor 1900 may generally include an outer liner assembly 1902, an inner liner assembly 1904 and a diffuser case module 1906 that surrounds the outer liner assembly 1902 and the inner liner assembly 1904. A combustion chamber 1908, positioned within the combustor 1900, has a generally annular configuration, defined by and comprising the outer liner assembly 1902, the inner liner assembly 1904 and a bulkhead liner assembly 1910. The outer liner assembly 1902 and the inner liner assembly 1904 are generally cylindrical and radially spaced apart, with the bulkhead liner assembly 1910 positioned generally at a forward end of the combustion chamber 1908. The outer liner assembly 1902 is spaced radially inward from an outer diffuser case 1912 of the diffuser case module 1906 to define an outer annular plenum 1914. The inner liner assembly 1904 is spaced radially outward from an inner diffuser case 1916 of the diffuser case module 1906 to define, in-part, an inner annular plenum 1918. Although a particular combustor is illustrated, it should be understood that this disclosure is also applicable to other combustor types having various combustor liner arrangements, various of which are described below. During operation, compressed air from a core flow path C enters the forward section of the combustion chamber 1908 and is mixed with fuel while the remainder of the compressed air enters the outer annular plenum 1914 and the inner annular plenum 1918.

Still referring to FIGS. 19A and 19B, the combustor includes one or more pairs of noise attenuation panels, including for example, a forward outer cooling flow noise attenuation panel 1920 and a forward inner cooling flow noise attenuation panel 1922, an aft outer cooling flow noise attenuation panel 1924 and an aft inner cooling flow noise attenuation panel 1926, and an outer diffuser case noise attenuation panel 1928 and an inner diffuser case noise attenuation panel 1930. As illustrated in FIG. 19B, the pairs of noise attenuation panels, in various embodiments, are spaced about the combustor 1900 in the circumferential direction (e.g., at 120° intervals, as illustrated in FIG. 19B, or at other suitable intervals), but the disclosure contemplates other configurations, including embodiments where one or more noise attenuation panels are configured to extend up to the entire 360° about the combustor. In addition, while not expressly illustrated in the figures, the disclosure contemplates perforations placed in or through the various liner assemblies and diffuser cases such that the acoustic waves or energy generated in the combustion chamber 1908 (e.g., combustor tones 1931, 1932 and 1933) is able to interact with the noise attenuation panels. Note that while pairs of noise attenuation panels are described and illustrated, the disclosure contemplates the use of single noise attenuation panels as well, positioned in the various locations just described. Further, while any of the noise attenuation panels previously described may be employed in the combustor 1900 to attenuate acoustic waves or energy generated in the combustion chamber 1908 (e.g., combustor tones 1931, 1932 and 1933), beneficially, the forward outer cooling flow noise attenuation panel 1920 and the forward inner cooling flow noise attenuation panel 1922 and the aft outer cooling flow noise attenuation panel 1924 and the aft inner cooling flow noise attenuation panel 1926 may be cooled by the compressed air from the core flow path C by employing the structures described above with reference to FIGS. 17A-17D and FIGS. 18A-18G. The outer diffuser case noise attenuation panel 1928 and the inner diffuser case noise attenuation panel 1930 are considered far enough away from the combustion chamber 1908 such that no cooling is required, but cooling may be incorporated nonetheless—e.g., via compressed air supplied by a low-pressure or high-pressure compressor. In addition, one potential advantage of using one or more of the aft outer cooling flow noise attenuation panel 1924, the aft inner cooling flow noise attenuation panel 1926, the outer diffuser case noise attenuation panel 1928 or the inner diffuser case noise attenuation panel 1930 is these panels exhibit reduced or eliminated pressure drop through the outer annular plenum 1914 and the inner annular plenum 1918 when compared with the pressure drop introduced by use of one or both of the forward outer cooling flow noise attenuation panel 1920 and the forward inner cooling flow noise attenuation panel 1922.

Figure 19C:
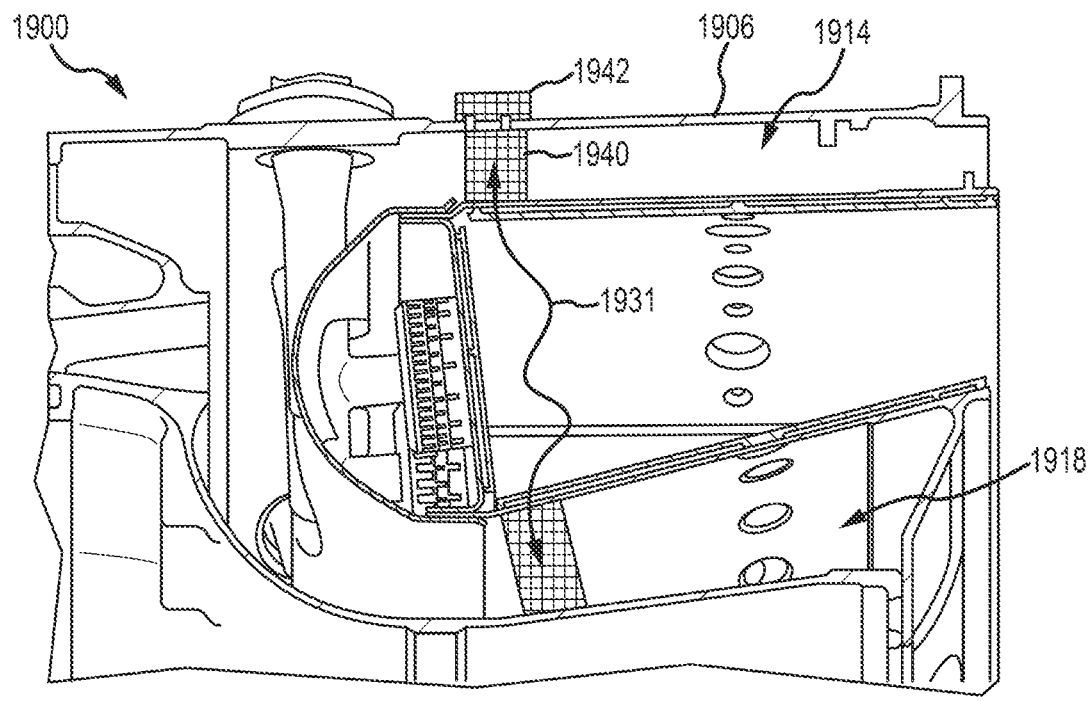
Figure 19D:
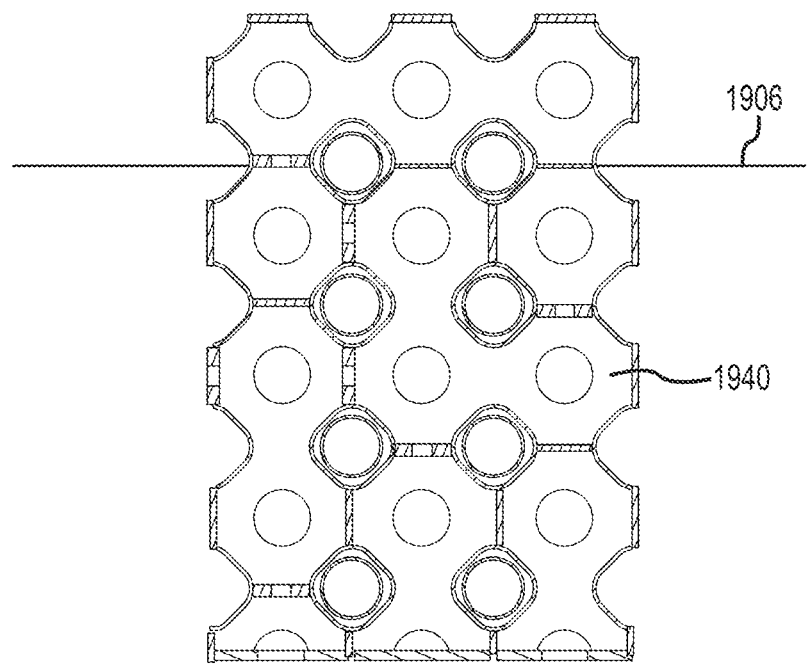

Referring now more specifically to FIGS. 19C and 19D, and with continued reference to FIGS. 19A and 19B, the combustor 1900 may include a noise attenuation panel 1940, such as, for example, one or more of the forward outer cooling flow noise attenuation panel 1920, the forward inner cooling flow noise attenuation panel 1922, the aft outer cooling flow noise attenuation panel 1924 and the aft inner cooling flow noise attenuation panel 1926 described above. The noise attenuation panel 1940 is typically positioned in one of the outer annular plenum 1914 and the inner annular plenum 1918. Attached to the noise attenuation panel 1940 and positioned radially outside of the diffuser case module 1906 is an extended noise attenuation panel 1942, which provides additional attenuation of acoustic waves and energy (e.g., combustor tones 1931). For example, where lower frequency ranges are targeted for attenuation, it is beneficial to increase the volume of the noise attenuation panel 1940, which may be accomplished via addition of the extended noise attenuation panel 1942. As described above, while any of the noise attenuation panels previously described may be employed in the combustor 1900 to attenuate acoustic waves or energy generated in the combustion chamber 1908, beneficially, the noise attenuation panel 1940 (as well as the extended noise attenuation panel 1942) may be cooled by the compressed air from the core flow path C by employing the structures described above with reference to FIGS. 17A-17D and FIGS. 18A-18G.

Figure 20A:
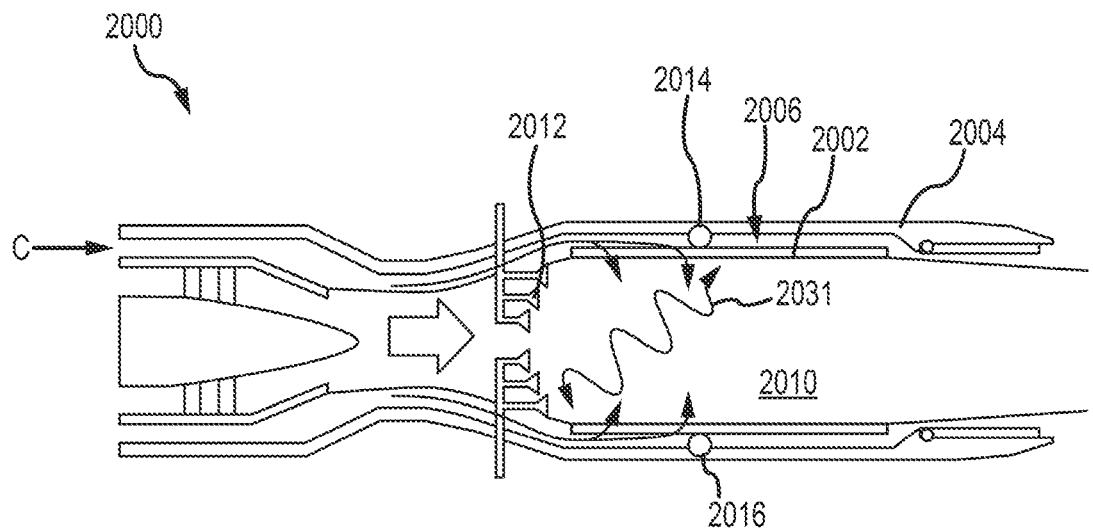
FIGS. 20A and 20B are schematic illustrations of a combustor having a noise attenuation panel, in accordance with various embodiments.
Figure 20B:
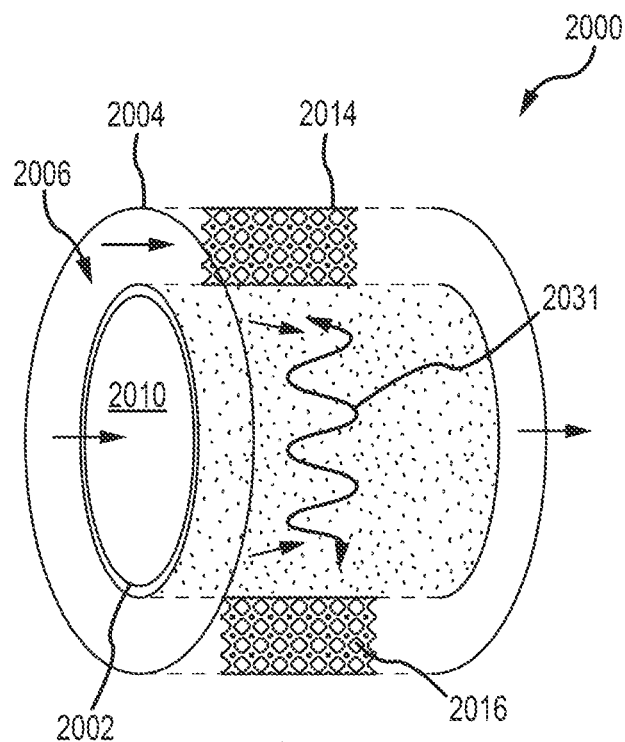

Referring now to FIGS. 20A and 20B, a combustor 2000 is illustrated and described. In various embodiments, the combustor 2000 may be employed downstream of the combustor section 112 described above or may be used as a stand-alone unit. In various embodiments, the combustor 2000 may generally include an annular liner assembly 2002 surrounded by and spaced radially from an annular casing 2004, which together define an annular cooling passage 2006 that extends radially and longitudinally between the annular liner assembly 2002 and the annular casing 2004. A combustion chamber 2010 is provided radially inward of the annular liner assembly 2002. In various embodiments, the combustion chamber 2010 receives fuel from a plurality of injectors 2012 positioned upstream of the combustion chamber 2010 and the annular cooling passage 2006 receives compressed air from a core flow path C, where the compressed air is used to both cool the annular liner assembly 2002 and to provide an oxidant to the combustion chamber 2010. Similar to the combustor 1900 described above, the combustor 2000 may include one or more noise attenuation panels, such as, for example, a first cooling flow noise attenuation panel 2014 and a second cooling flow noise attenuation panel 2016 spaced radially opposite the first cooling flow noise attenuation panel 2014. As illustrated, the first cooling flow noise attenuation panel 2014 and the second cooling flow noise attenuation panel 2016, in various embodiments, are spaced about the combustor 2000 in the circumferential direction (e.g., at 180° intervals, as illustrated, or at other suitable intervals). Note that while any of the noise attenuation panels previously described may be employed in the combustor 2000 to attenuate acoustic waves or energy generated in the combustion chamber 2010 (e.g., combustor tones 2031), beneficially, the first cooling flow noise attenuation panel 2014 and the second cooling flow noise attenuation panel 2016 may be cooled by the compressed air from the core flow path C by employing the structures described above with reference to FIGS. 17A-17D and FIGS. 18A-18G.

Figure 21:
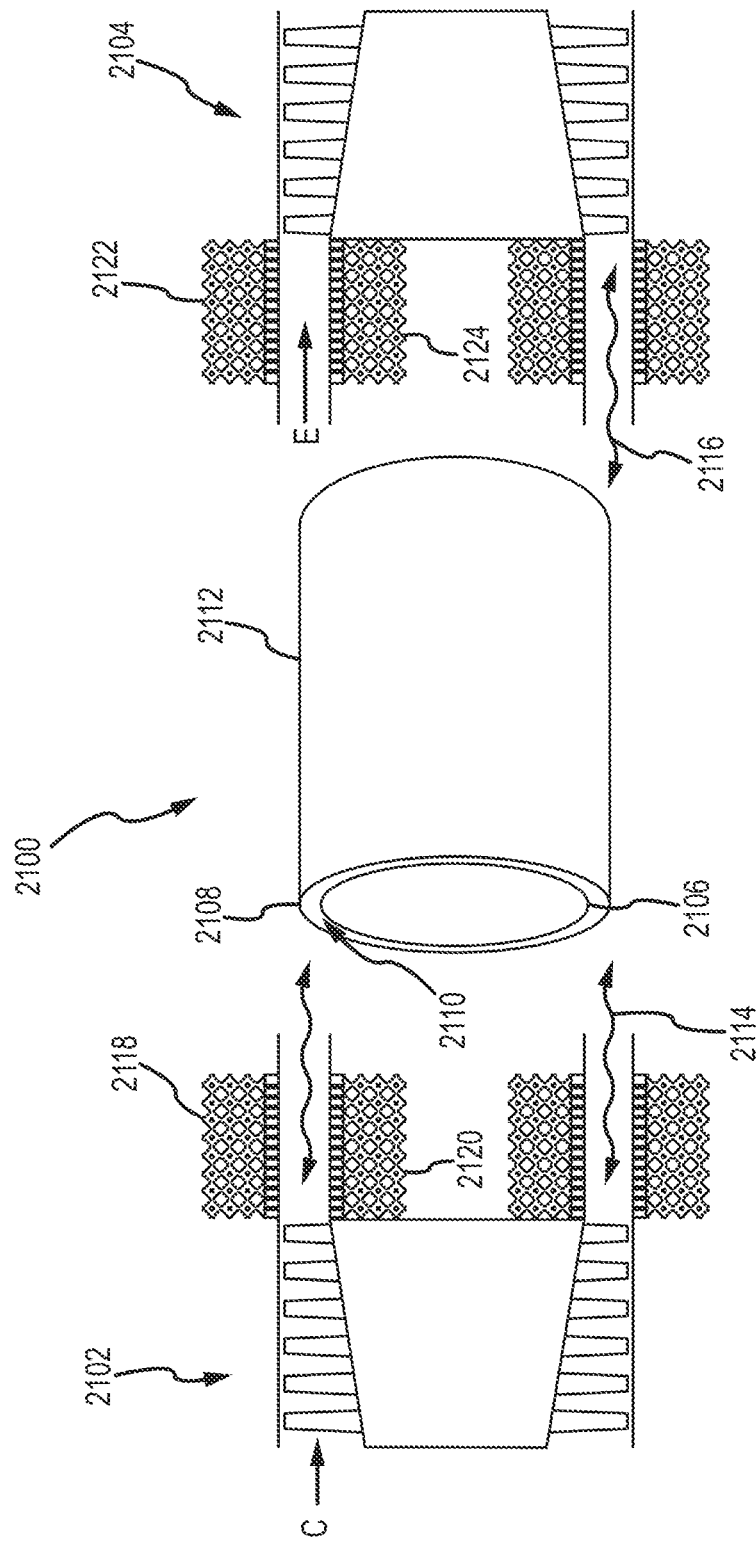
FIG. 21 is a schematic illustration of a combustor having a noise attenuation panel, in accordance with various embodiments.

Referring now to FIG. 21, a combustor 2100 is illustrated and described. In various embodiments, the combustor 2100 is disposed downstream of a compressor section (e.g., the high-pressure compressor section 110 (HPC)) and upstream of a turbine section (e.g., the high-pressure turbine section 114 (HPT)). In various embodiments, the combustor 2100 may generally include an annular inner casing 2106 surrounded by and spaced radially from an annular outer casing 2108, which together define an annular combustion chamber 2110 that extends radially and longitudinally between the annular inner casing 2106 and the annular outer casing 2108. In various embodiments, the combustor 2100 in the form described is representative of a rotating detonation engine 2112, which receives fuel and oxidant and supports a detonation wave that travels circumferentially about the annular combustion chamber 2110. As illustrated, upstream running combustor tones 2114 and downstream running combustor tones 2116 are generated by the combustion occurring in the annular combustion chamber 2110. An outer forward noise attenuation panel 2118 and an inner forward noise attenuation panel 2120 may be positioned radially outside and radially inside, respectively, of a core flow path C and configured to attenuate the upstream running combustor tones 2114. Similarly, an outer aft noise attenuation panel 2122 and an inner aft noise attenuation panel 2124 may be positioned radially outside and radially inside, respectively, of an exhaust flow path E and configured to attenuate the downstream running combustor tones 2116. As with the foregoing embodiments, note that while any of the noise attenuation panels previously described may be employed in the combustor 2100 to attenuate acoustic waves or energy generated in the combustion chamber 2010 (e.g., the upstream running combustor tones 2114 and the downstream running combustor tones 2116), beneficially, one or more of the outer forward noise attenuation panel 2118, the inner forward noise attenuation panel 2120, the outer aft noise attenuation panel 2122 and the inner aft noise attenuation panel 2124 may be cooled by the compressed air from the core flow path C by employing the structures described above with reference to FIGS. 17A-17D and FIGS. 18A-18G.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A noise attenuation panel for a structure within a propulsion system, comprising:
   a first plurality of unit cells, each unit cell of the first plurality of unit cells including a central body and a plurality of tubes extending from the central body, and each unit cell of the first plurality of unit cells is connected to a respective adjacent unit cell of the first plurality of unit cells via a respective tube of the plurality of tubes, each respective tube of the plurality of tubes extending from one unit cell of the first plurality of unit cells to the respective adjacent unit cell of the first plurality of unit cells, the first plurality of unit cells having a first periodic structure forming a first lateral layer of unit cells;
   a plurality of volumes between the first plurality of unit cells, the plurality of volumes defined by the first periodic structure; and
   a second plurality of unit cells, the second plurality of unit cells merged within the first plurality of unit cells, the second plurality of unit cells disposed within the plurality of volumes.

2. The noise attenuation panel of claim 1, wherein exterior surfaces of the first plurality of unit cells and the second plurality of unit cells are spaced apart to form a spacing between the exterior surfaces.

3. The noise attenuation panel of claim 2, wherein the spacing provides a flow path for a cooling fluid to flow between the exterior surfaces of the first plurality of unit cells and the second plurality of unit cells.

4. The noise attenuation panel of claim 3, wherein the first plurality of unit cells defines a first noise attenuation flow path and the second plurality of unit cells defines a second noise attenuation flow path.

5. The noise attenuation panel of claim 4, wherein the first noise attenuation flow path and the second noise attenuation flow path are configured to attenuate different frequency ranges.

6. The noise attenuation panel of claim 5, wherein the plurality of volumes includes a first volume having a first volume size and a second volume having a second volume size different from the first volume size.

7. The noise attenuation panel of claim 6, wherein a first unit cell of the first plurality of unit cells includes a first central body and a first axial tube disposed on the first central body and a second axial tube disposed on the first central body, opposite the first axial tube, each of the first axial tube and the second axial tube being in fluid communication with one another through the first central body.

8. The noise attenuation panel of claim 7, wherein the first unit cell includes a first lateral tube, disposed on and in fluid communication with the first central body, and a second lateral tube, opposite the first lateral tube and disposed on and in fluid communication with the first central body.

9. The noise attenuation panel of claim 8, wherein the first unit cell includes a third lateral tube, disposed on and in fluid communication with the first central body, and a fourth lateral tube, opposite the third lateral tube and disposed on and in fluid communication with the first central body and wherein each of the first axial tube, the second axial tube, the first lateral tube, the second lateral tube, the third lateral tube and the fourth lateral tube are in fluid communication with each other via the first central body.

10. The noise attenuation panel of claim 9, wherein the first axial tube exhibits a first axial tube size, the second axial tube exhibits a second axial tube size, the first lateral tube exhibits a first lateral tube size, the second lateral tube exhibits a second lateral tube size, the third lateral tube exhibits a third lateral tube size and the fourth lateral tube exhibits a fourth lateral tube size and at least one of the first axial tube size, the second axial tube size, the first lateral tube size, the second lateral tube size, the third lateral tube size or the fourth lateral tube size exhibits a first size and at least one of another of the first axial tube size, the second axial tube size, the first lateral tube size, the second lateral tube size, the third lateral tube size or the fourth lateral tube size exhibits a second size that is different from the first size.

11. The noise attenuation panel of claim 10, wherein at least one of the first axial tube, the second axial tube, the first lateral tube, the second lateral tube, the third lateral tube or the fourth lateral tube is completely sealed via a wall configured to block a flow of fluid therethrough.

12. The noise attenuation panel of claim 10, wherein at least one of the first axial tube, the second axial tube, the first lateral tube, the second lateral tube, the third lateral tube or the fourth lateral tube is partially sealed to restrict a flow of fluid therethrough.

13. The noise attenuation panel of claim 9, wherein the first unit cell exhibits a first unit cell size, a second unit cell of the first plurality of unit cells exhibits a second unit cell size, a third unit cell of the first plurality of unit cells exhibits a third unit cell size and a fourth unit cell of the first plurality of unit cells exhibits a fourth unit cell size and at least one of the first unit cell size, the second unit cell size, the third unit cell size or the fourth unit cell size exhibits a first size and at least one of another of the first unit cell size, the second unit cell size, the third unit cell size or the fourth unit cell size exhibits a second size that is different from the first size.

14. A combustor for a gas turbine engine, comprising:
    a combustion chamber; and
    a noise attenuation panel, including:
       a first plurality of unit cells, each unit cell of the first plurality of unit cells including a central body and a plurality of tubes extending from the central body, and each unit cell of the first plurality of unit cells is connected to a respective adjacent unit cell of the first plurality of unit cells via a respective tube of the plurality of tubes, each respective tube of the plurality of tubes extending from one unit cell of the first plurality of unit cells to the respective adjacent unit cell of the first plurality of unit cells, wherein the first plurality of unit cells has a first periodic structure that defines a plurality of volumes between the first plurality of unit cells; and
       a second plurality of unit cells, the second plurality of unit cells merged within the first plurality of unit cells, the second plurality of unit cells disposed within the plurality of volumes.

15. The combustor of claim 14, wherein exterior surfaces of the first plurality of unit cells and the second plurality of unit cells are spaced apart to form a spacing between the exterior surfaces.

16. The combustor of claim 15, wherein the spacing provides a flow path for a cooling fluid to flow between the exterior surfaces of the first plurality of unit cells and the second plurality of unit cells.

17. The combustor of claim 16, wherein the first plurality of unit cells defines a first noise attenuation flow path and the second plurality of unit cells defines a second noise attenuation flow path.

18. The combustor of claim 17, wherein the first noise attenuation flow path and the second noise attenuation flow path are configured to attenuate different frequency ranges.

\* \* \* \* \*